United States Patent [19]

Kimura et al.

[11] Patent Number: 5,778,189
[45] Date of Patent: Jul. 7, 1998

[54] SYSTEM AND METHOD FOR CONVERTING COMMUNICATION PROTOCOLS

[75] Inventors: Nobuko Kimura; Takashi Onodera; Noriyuki Yokoshi, all of Kawasaki, Japan

[73] Assignee: Fujitsu Limited, Kanagawa, Japan

[21] Appl. No.: 786,235

[22] Filed: Jan. 21, 1997

[30] Foreign Application Priority Data

May 29, 1996 [JP] Japan ..................... 8-134700

[51] Int. Cl.$^6$ ............................ G06F 13/00
[52] U.S. Cl. ................................. 395/200.66
[58] Field of Search ............ 364/DIG. 1 MS File, 364/DIG. 2 MS File, 680; 395/527, 200.3, 200.57, 200.58, 200.6, 200.61, 200.62, 200.66, 200.68, 200.79

[56] References Cited

U.S. PATENT DOCUMENTS 5,073,852  12/1991  Siegel et al. .................. 364/680
5,142,622   8/1992  Owens ........................ 395/200.57
5,428,771   6/1995  Daniels et al. .................. 395/671

*Primary Examiner*—Robert B. Harrell
*Attorney, Agent, or Firm*—Helfgott & Karas, P C

[57] ABSTRACT

A protocol conversion system that provides improved reliability in data transmission and reception. The system comprises a first node belonging to a network A, a second node belonging to another network B, and a protocol converter disposed between the two nodes. The first node uses a first communications protocol that defines a set of rules for communications in the network A, while the second node uses a second communications protocol for the network B. Serving as a relaying device between the first node and second node, the protocol converter converts the communications protocol of the messages traveling between them. The protocol converter comprises a first message processor to process the messages according to layer definitions of the first communications protocol, a second message processor to process the messages according to layer definitions of the second communications protocol, and a first protocol converter that adds and removes some control information to/from the messages for protocol conversion. The second node comprises a second protocol converter working as a counterpart of the first protocol converter.

12 Claims, 22 Drawing Sheets

SYSTEM AND METHOD FOR CONVERTING COMMUNICATION PROTOCOLS

BACKGROUND OF THE INVENTION

1. Field of the Invention

The present invention relates to a system and method for converting communications protocols, and more specifically, to a system and method for converting communications protocols to enable two different networks to exchange data.

2. Description of the Related Art

The proliferation of multi-vendor open system environments, as part of the major trends in today's computer communications technologies, has brought a wide variety of user needs for different types of networking. Particularly, there are increasing demands for linking one existing computer network to some other local area networks (LAN) or to a remote host computer.

To bridge from one closed network environment to another, it is necessary to use some special equipment such as routers for simpler connection or protocol converters, also known as gateways, for higher level interconnection.

Routers are intermediate devices for interconnecting two separate networks, which support only lower layers including the network layer and below. Routers will examine the destination address of each message and transfer the messages to their relevant destination networks, based on the knowledge about what kind of communications entities reside in each network. Gateways are another type of intermediate devices which provide full protocol services up to the application layer to convert a message sent from one network so that it will comply with a different communications protocol that can be handled by another computer.

The above-described routers and gateways, however, have the following drawbacks. The routers, lacking functionalities of the transport and upper layers, cannot cope by themselves with such network troubles as messages lost in the middle of journey or message arrival in improper order. The gateways forward messages sent from one network to another network after translating their communications protocol, and thus they are not always aware of troubles that may happen in the target network. Furthermore, development of a gateway system consumes much time and money because it is actually a large collection of software programs supporting complete protocol stacks up to the application layer.

Also, the conventional protocol converters, including routers and gateways in a broad sense, have no capabilities of transmitting test data to the existing network entities. To conduct a test for an internetwork communications link between two separate networks, it is always necessary to prepare one device for each network under test. The test would be efficient if it was possible to separately examine each end of the link under test; however, the conventional protocol converters do not allow such a test method because of the lack of diagnostic test facilities.

SUMMARY OF THE INVENTION

Taking the above into consideration, an object of the present invention is to provide a system for converting communications protocols with improved reliability of data transmission and reception.

Another object of the present invention is to provide a system for converting communications protocols, which enables a communications link test to be performed efficiently by using a function of test data transmission.

Still another object of the present invention is to provide a method of converting communications protocols with improved reliability of data transmission and reception.

To accomplish the above objects, according to the present invention, there is provided a protocol conversion system for converting communications protocols to enable two different networks to exchange data by transmitting and receiving messages.

The system comprises a first node using a first communications protocol that defines a set of rules for communications in a first network and a second node using a second communications protocol that defines a set of rules for communications in a second network. Here, the second node comprises second protocol conversion means for adding first control information to the messages to be sent out and for removing second control information from the messages received. The first control information is information required in frame conversion to the first communications protocol, while the second control information is information required in frame conversion to the second communications protocol.

The protocol conversion system further comprises a protocol converter, disposed between the first and second nodes, for relaying the messages between the first and second nodes. This protocol converter comprises first and second message processing means, and first protocol conversion means. The first message processing means is coupled to the first node and processes the frames according to layer definitions of the first communications protocol. The second message processing means is coupled to the second node via the second network and processes the frames according to layer definitions of the second communications protocol. The first protocol conversion means is disposed between said first and second message processing means. This first protocol conversion means converts the messages received from the second message processing means by using the first control information removed therefrom and then passes to the first message processing means the converted messages having a frame format acceptable for the first node. It also adds the second control information to the messages received from the first message processing means and then passes the messages with the second control information to the second message processing means.

To accomplish the above objects, there is also provided a protocol conversion method of converting communications protocols to enable two different networks to exchange data by transmitting and receiving messages. The networks include a first node that belongs to a first network and uses a first communications protocol and a second node that belongs to a second network and uses a second communications protocol.

The protocol conversion method comprises the following steps of: (a) processing a first message received from the first node according to lower layer definitions of the first communications protocol, (b) adding control information to the first message for conversion to the second communications protocol, (c) producing a second message by processing the first message having the control information according to lower layer definitions of the second communications protocol, (d) sending the second message to the second node, (e) processing the second message at the second node according to the lower layer definitions of the second communications protocol, (f) removing the control information from the second message, and (g) sending the second message without the control information to upper layers of the second communications protocol.

Furthermore, there is provided another protocol conversion method of converting communications protocols to enable two different networks to exchange data by transmitting and receiving messages. The networks include a first node that belongs to a first network and uses a first communications protocol and a second node that belongs to a second network and uses a second communications protocol.

This protocol conversion method comprises the following steps of: (a) processing a message at the second node according to upper layer definitions of the second communications protocol, (b) adding control information for conversion to the first communications protocol to the message processed, (c) producing a second message by processing the message having the control information according to lower layer definitions of the second communications protocol, (d) processing the second message according to the lower layer definitions of the second communications protocol, (e) removing the control information from the second message, (f) converting the second message to a frame format that can be handled by the first node, (g) producing a first message by processing the converted second message according to the lower layer definitions of the second communications protocol, and (h) sending the first message to the first node.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENT

An embodiment of the present invention will be described below, referring to the accompanying drawings.

Figure 1:
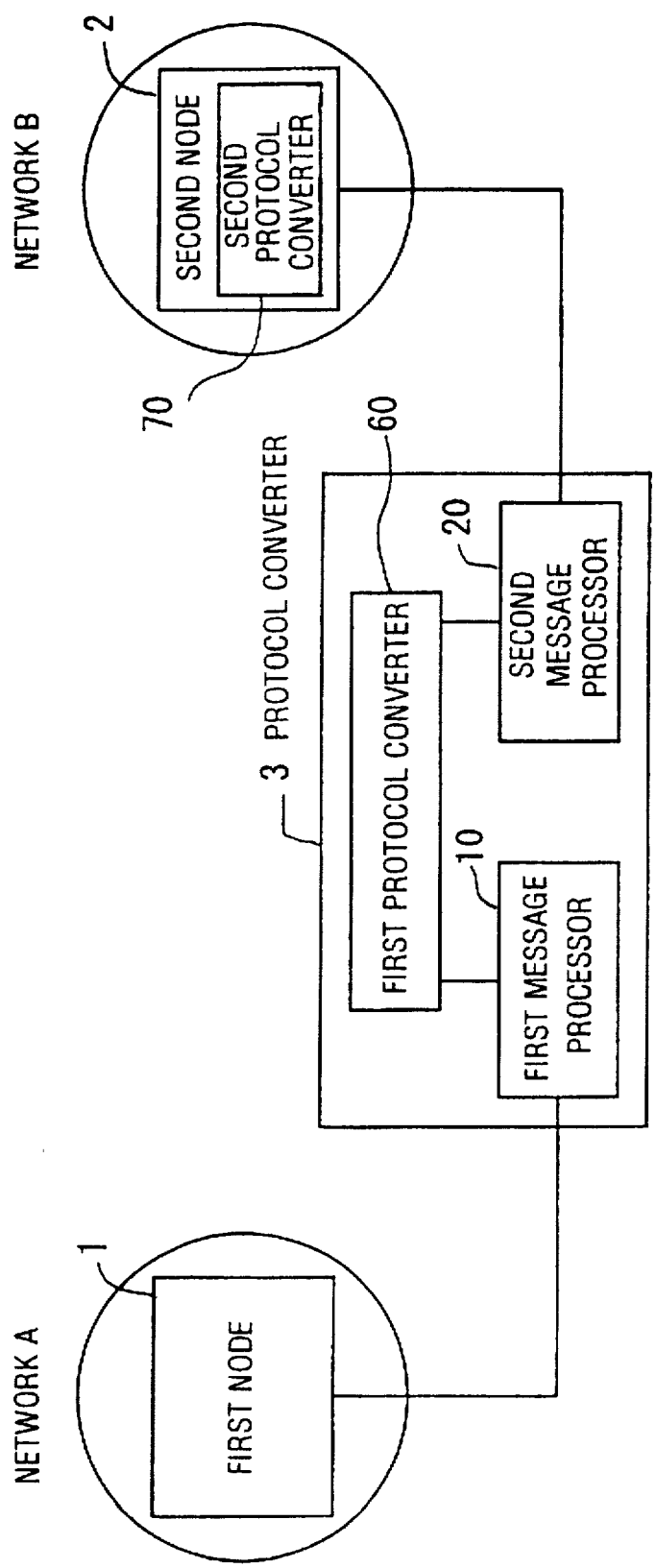
FIG. 1 is a conceptual view of a protocol conversion system according to the present invention.

FIG. 1 is a conceptual view of a protocol conversion system according to the present invention. The protocol conversion system comprises: a first node 1 which exchanges information with other nodes, using a first communications protocol that defines a set of rules for communications in a network A; a second node 2 which exchanges information with other nodes, using a second communications protocol that defines a set of rules for communications in another network B; and a protocol converter 3 for linking the first node 1 and the second node 2 by converting the protocols.

The protocol converter 3 comprises first message processing means 10 for processing communications data (also called "messages" or "frames") according to protocol layer definitions of the first communications protocol, second message processing means 20 for processing the messages according to protocol layer definitions of the second communications protocol, and first protocol conversion means 60 for converting the protocols of the messages from one to the other. The second node 2 further comprises second protocol conversion means 70, which is disposed between the transport layer and the session layer. The upper layers of the protocol stacks in the first node 1 and second node 2 are based on the same protocol specifications.

This protocol conversion system will work as follows, when a message addressed to the second node 2 is sent out from the first node 1. Upon reception of the message, the first message processing means 10 subjects the received message to each layer process of the first communications protocol, from the physical layer to the transport layer. The first message processor 10 thus obtains a frame format that would be applicable to the session layer.

Then the first protocol conversion means 60 performs protocol conversion in this frame format and forwards the converted message to the second message processing means 20. The second message processing means 20 subjects the received message to each layer process of the second communications protocol, from the transport layer down to the physical layer, thus sending the processed message to the second node 2.

Upon reception of the message sent from the second message processing means 20, the second node 2 processes it through lower protocol layers of the second communications protocol and obtains a frame format that is applicable to its session layer. The second protocol conversion means 70 then performs protocol conversion before passing the message to the session layer.

The two different networks A and B can exchange information through the above-described procedure of protocol conversion. When the second node 2 has transmitted a message toward the first node 1, the message will reversely travels along the information path explained above. That is, the message processed in the upper layers of the second node 2 is protocol-converted by the second protocol conversion means 70. The message passes down through the lower layer processes and then arrives at the second message processing means 20 in the protocol converter 3. According to the second communications protocol, the second message processing means 20 subjects the received message to each layer process, from the physical layer up to the transport layer.

The first protocol conversion means 60 performs protocol conversion for the message processed by the second message processing means 20, and the first message processing means 10 processes the converted message from the transport layer down to the physical layer, according to the first communications protocol. The message that has passed down through the protocol layers is finally sent out to the first node 1.

Figure 2:
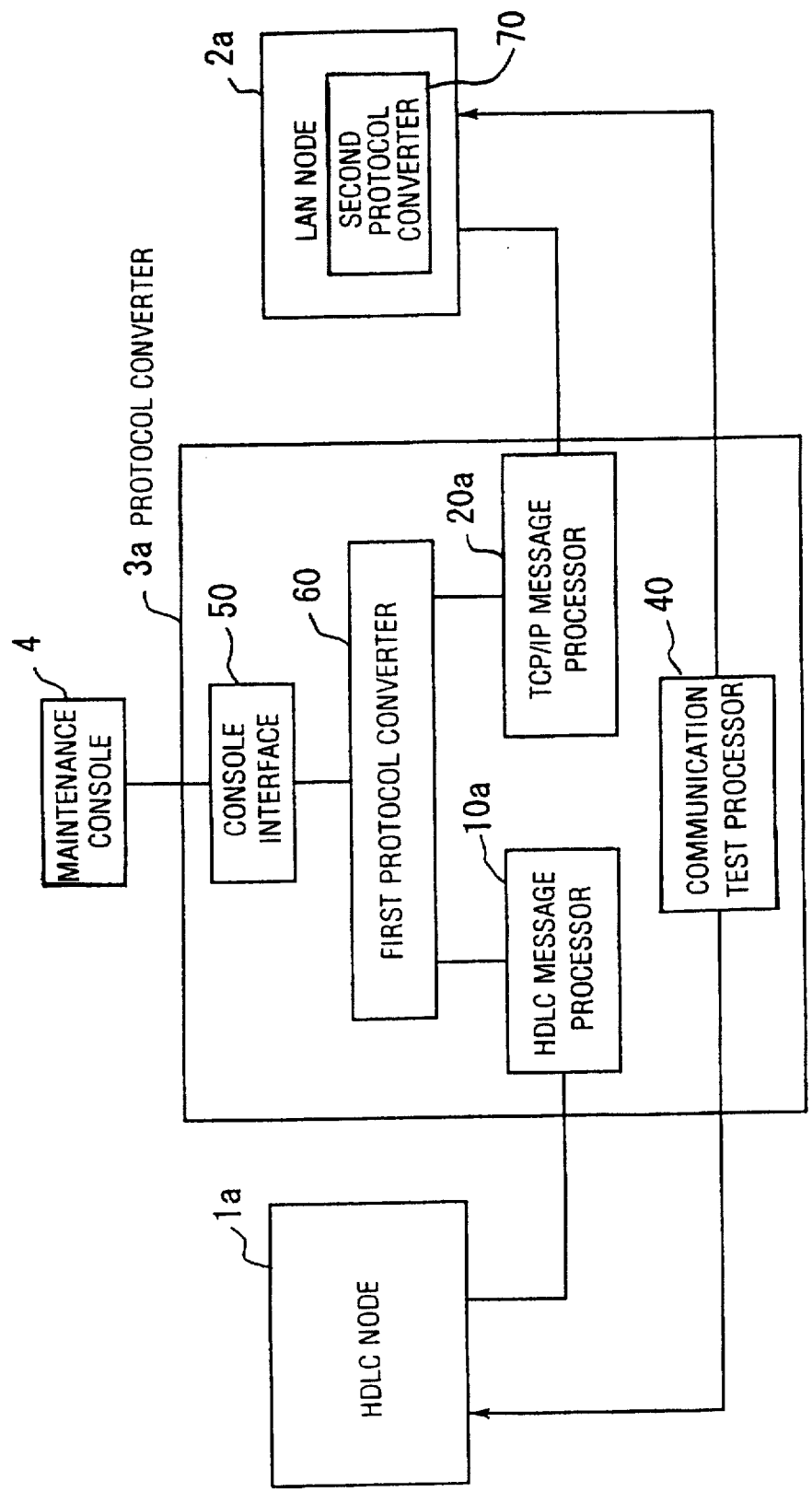
FIG. 2 is a diagram showing the structure of a protocol conversion system.

The following description will present the detailed configuration and operation of the protocol conversion system of the present invention using a more specific example. FIG. 2 shows the structure of a protocol conversion system. This system is organized by an HDLC node 1a running with a high-level data link control (HDLC) protocol, a LAN node 2a running with the transmission control protocol/internet protocol (TCP/IP) suite, a protocol converter 3a linking the HDLC node 1a and LAN node 2a through its protocol conversion services, and a maintenance console 4 used for set-up and maintenance of the protocol converter 3a as well as conducting a communications link test over the network nodes.

The protocol converter 3a comprises an HDLC message processor 10a and a TCP/IP message processor 20a which process the messages according to each layer service definition of the HDLC and TCP/IP protocols, respectively. The protocol converter 3a further comprises a first converter 60, a communication test processor 40 for testing connections to the HDLC node 1a and LAN node 2a, and a console interface 50 to link the protocol converter 3a with the maintenance console 4.

This protocol converter 3a operates in the following way. Upon reception of a message from the HDLC node 1a, the HDLC message processor 10a applies the message to the layer processes of the physical layer to transport layer, thereby providing the message with a frame format applicable to the session layer. The first protocol converter 60 converts the message having this frame format so as to suit the TCP/IP message processor 20a. Upon reception of the converted message, the TCP/IP message processor 20a passes the message to its protocol stack, from the transport layer down to the physical layer.

In the LAN node 2a, the message received from the TCP/IP message processor 20a is processed by lower layers of its protocol stack and then converted by the second protocol converter 70 before reaching the session layer. As to a message transmitted in the opposite direction (i.e., from the LAN node 2a to the HDLC node 1a), this message will reversely travel along the information path explained above.

The communication test processor 40 conducts a test for the individual communications links extending from the protocol converter 3a to the HDLC node 1a or the LAN node 2a. The maintenance console 4, coupled through the interface means 50, is used to control various maintenance operations of the protocol converter 3a. More details of those elements will be described later on.

Figure 3:
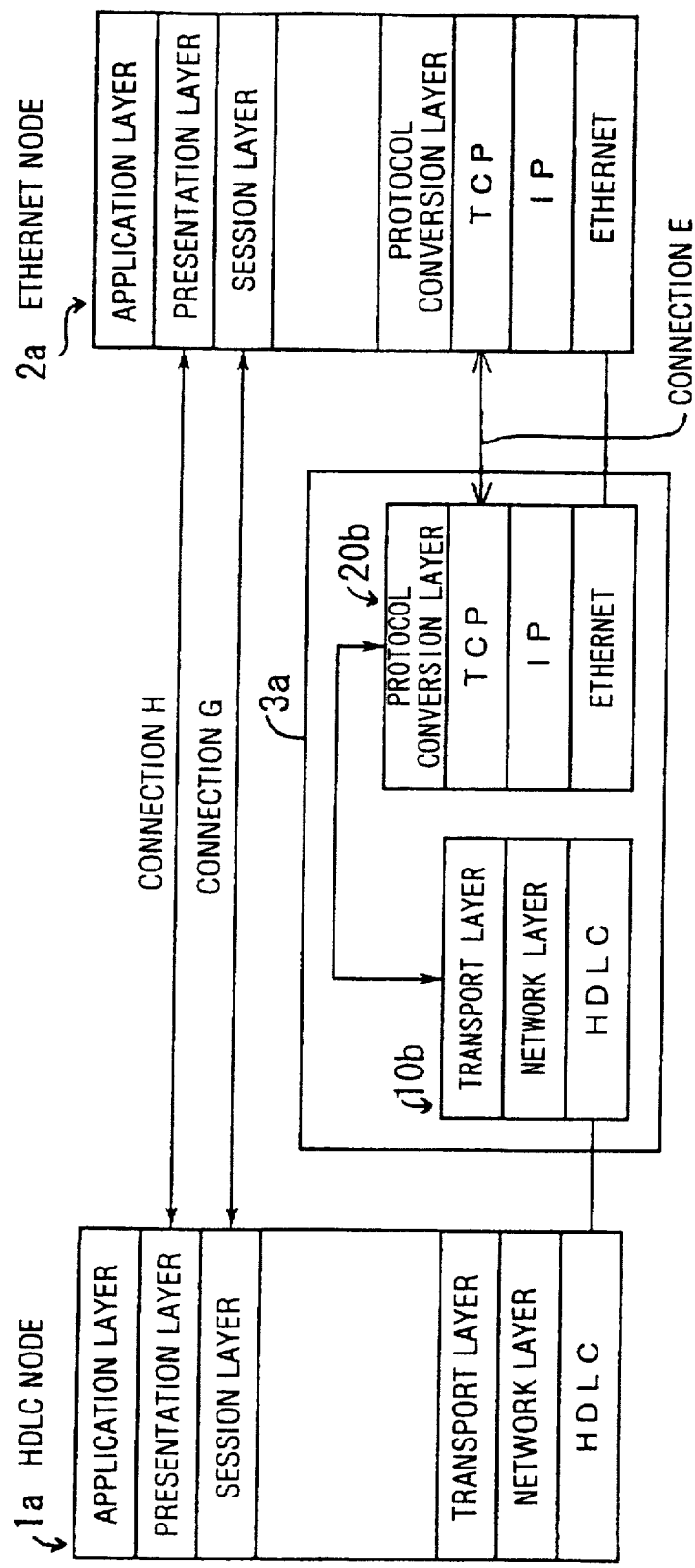
FIG. 3 is a diagram showing the structure of protocol stacks arranged in the protocol conversion system.

FIG. 3 shows the relationship between several protocol stacks in the protocol conversion system. Since the aforementioned LAN node 2a actually uses the Ethernet protocol suite in the system of FIG. 3, the node 2a will hereafter be referred to as "Ethernet node."

The protocol converter 3a has two protocol stacks: a protocol stack 10b used in the HDLC message processor 10a and a protocol stack 20b in the TCP/IP message processor 20a. The protocol stack 10b consists of an HDLC layer to provide the physical and data link layer services, a network layer, and a transport layer. The protocol stack 20b, on the other hand, consists of an Ethernet layer to provide physical and data link layer services, a data link layer based on the internet protocol (IP), a transport layer based on the transmission control protocol (TCP), and a protocol conversion layer for linking between the two different protocol stacks coexisting in the protocol converter 3a.

With respect to the upper layers, a logical connection G is established between the session layer of the HDLC node 1a and that of the Ethernet node 2a, allowing data to be exchanged between the two corresponding presentation layers. Likewise, a logical connection H established between the presentation layers of the two nodes enables the corresponding application layers to communicate with each other. Furthermore, a logical connection E between the TCP layer of the protocol stack 20b and that of the Ethernet node 2a allows data communication between the two corresponding protocol conversion layers.

As described in the above paragraph, the protocol conversion system of the present invention uses both connectionless protocols and connection-oriented protocols. The former are used to link the HDLC node 1a and protocol converter 3a, while the latter are used to link the Ethernet node 2a and protocol converter 3a at the TCP layer level.

Figure 4:
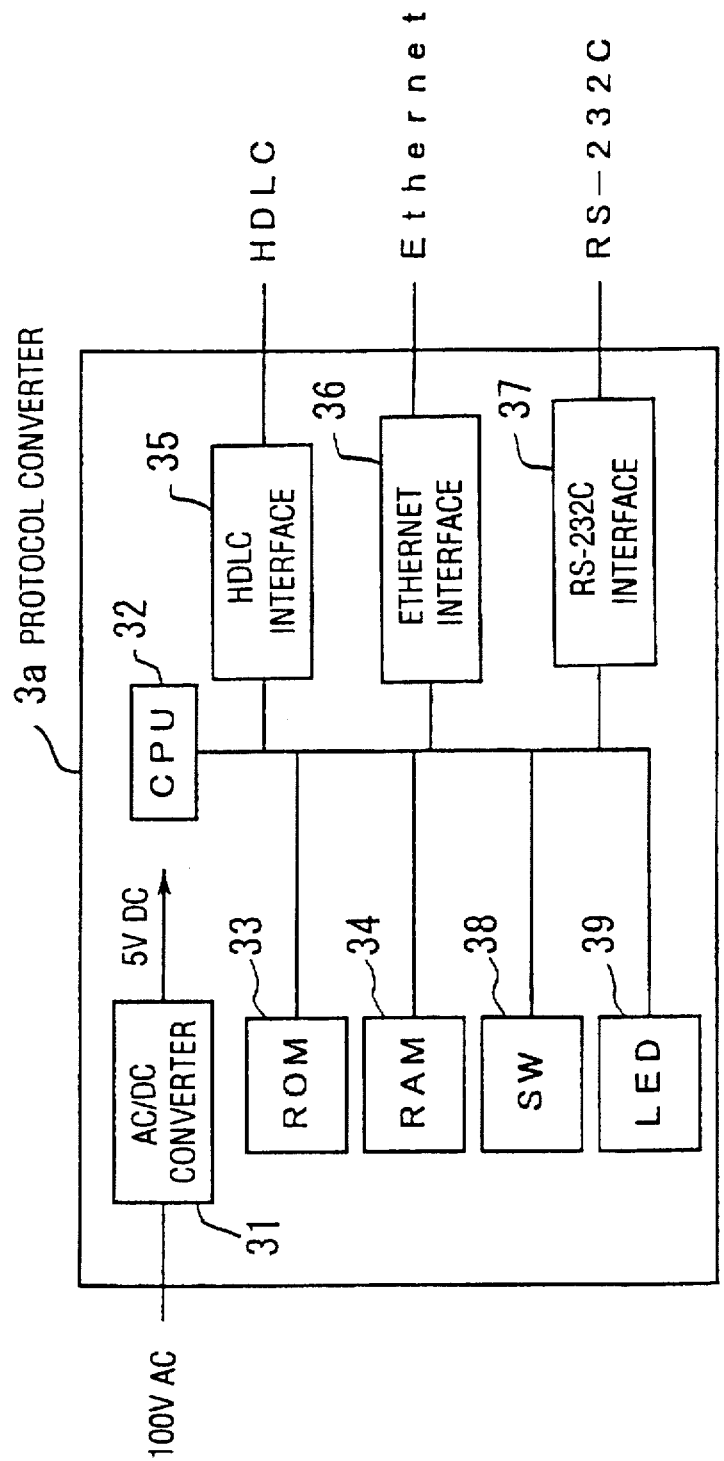
FIG. 4 is a diagram outlining the hardware structure of a protocol converter as part of the protocol conversion system.

Referring to FIG. 4, the following description will outline the hardware configuration of the protocol converter 3a. An AC/DC converter 31 provides the protocol converter circuit with a 5-volt DC supply voltage, converting the electricity from a commercial 100-volt AC power source. A central processing unit (CPU) 32 operating at 25 MHz controls the main part of the protocol converter 3a. A read-only memory (ROM) 33 consists of 1-megaword flash memory with a word size of 32-bit to store system control programs and two pieces of 32-word serial electrically-erasable ROMs (serial EEPROMs) with a word size of 16-bit to hold communication addresses and other routing information. A random access memory (RAM) 34, organized by 1-megaword dynamic RAM (DRAM) with a word size of 8-bit, serves as temporary storage for input and output signal status and other information. An HDLC interface 35 controls the HDLC link interface to the HDLC node 1a, while an Ethernet interface 36 provides an Ethernet link to the Ethernet node 2a. An RS-232C interface 37 is an EIA RS-232C standard serial port to link the maintenance console 4. Switches (SW) 38 are used in a communications link test, and light emitting diodes (LED) 39 indicate the results of the test.

Figure 5:
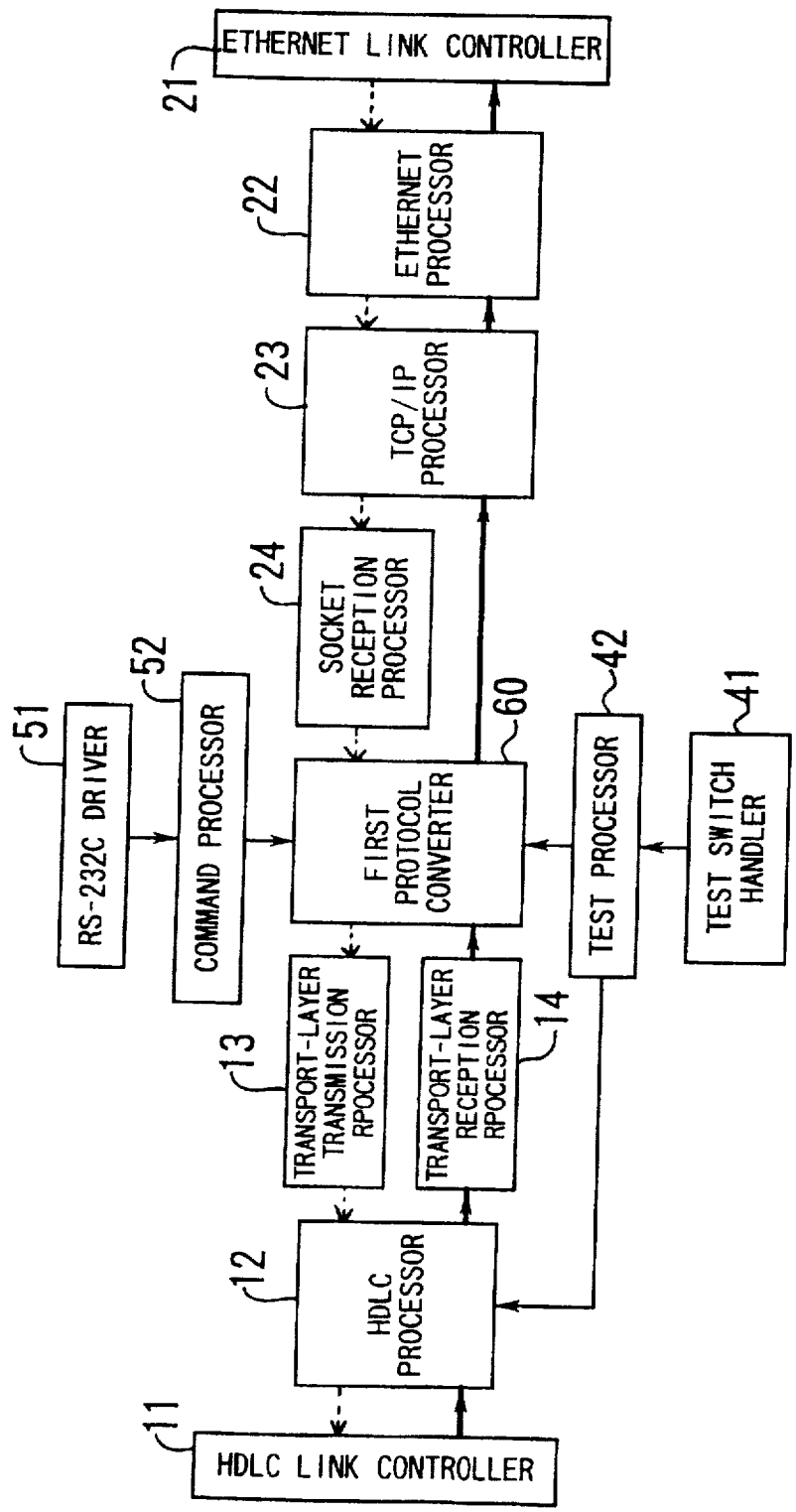
FIG. 5 is a block diagram showing the internal structure of the protocol converter.
Figure 6:
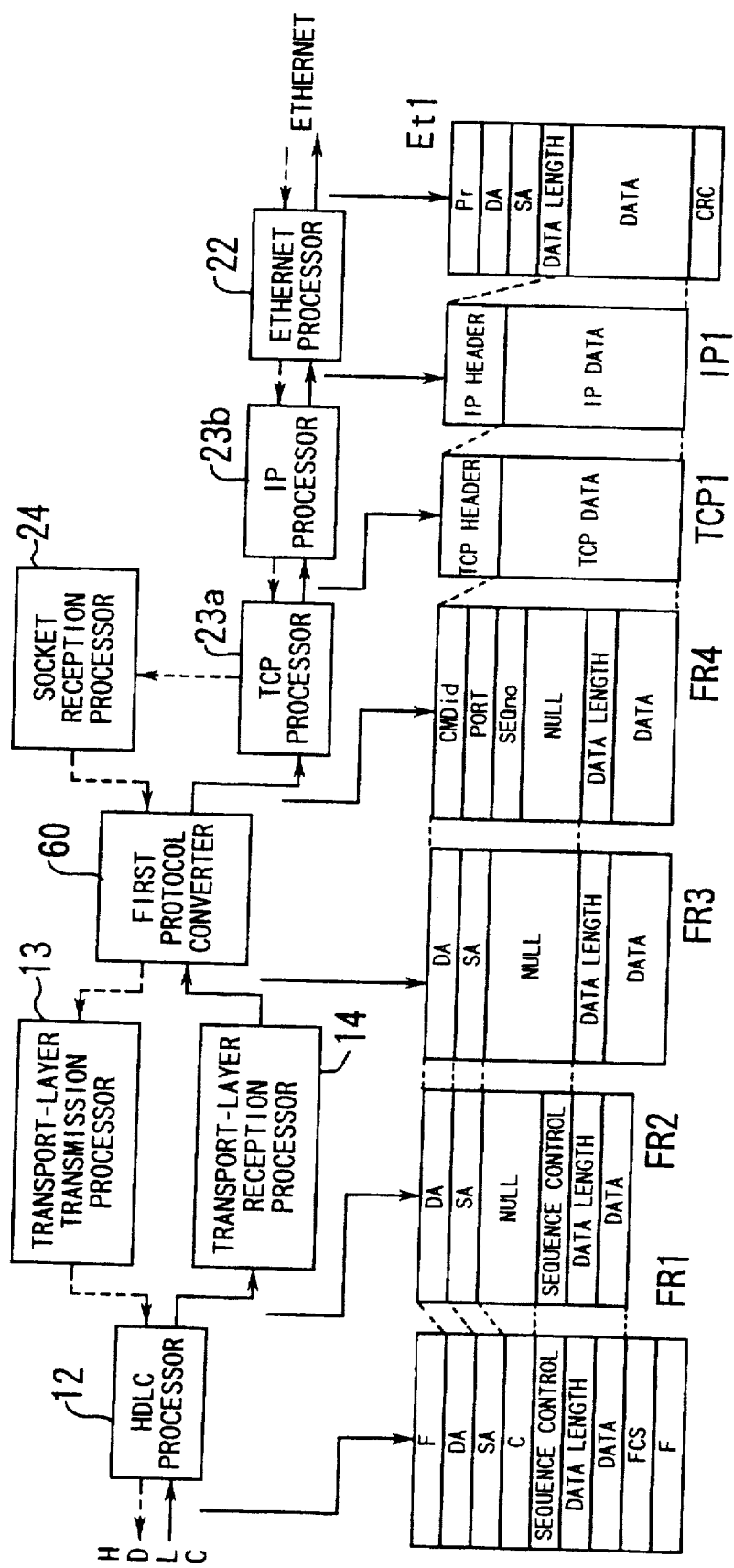
FIG. 6 is a diagram showing how frames are translated by the protocol converter.

The following will describe the structural arrangement and operation of the protocol converter 3a, using FIGS. 5 and 6 for reference. FIG. 5 is a block diagram showing the internal structure of the protocol converter 3a, which includes a collection of function blocks described below. An HDLC link controller 11 provides a physical layer interface on the HDLC side, and an HDLC processor 12 offers data link and network layer services. A transport-layer transmission processor 13 and a transport-layer reception processor 14 support transport layer services, depending on the direction of the message flow. A first protocol converter 60 is a piece of firmware that carries out protocol conversion. On the Ethernet side, an Ethernet link controller 21 provides physical layer interface, and an Ethernet processor 22 supports data link layer services. The TCP/IP processor 23 processes the TCP and IP protocols. A socket reception processor 24 executes a task to examine whether any TCP/IP message has arrived or not. The firmware further includes a TEST switch handler 41 and a test processor 42 for initiating and performing a communications link test. An RS-232C driver 51 provides the RS-232C serial interface control to communicate with the maintenance console 4, and a command processor 52 parses and processes various commands sent from the maintenance console 4.

In FIG. 5, the function blocks are interconnected by three kinds of arrows (i.e., narrow solid, bold solid, and broken arrows) indicating different data paths. Messages sent from the HDLC node to the Ethernet node will travel across this block diagram from the left to the right as indicated by the bold solid arrows. In contrast, messages transmitted from the Ethernet node to the HDLC node will pass through the function blocks from the right to the left as indicated by the broken arrows.

FIG. 6 shows the operation of the individual function blocks introduced above, assuming that the HDLC node has transmitted a message toward the Ethernet node. Frame formats FR1-FR4, TCP1, IP1 and Et1 arranged in the bottom of FIG. 6 specifically depict how the message will be translated by each stage of the protocol converter.

First, the HDLC processor 12 receives a frame FR1 from the HDLC link controller 11 (not shown in FIG. 5), which frame consists of two synchronization flag fields F, a destination address field DA, a source address field SA, a control field C, a sequence control field, a data length field, an information field, and a frame check sequence FCS. Here, several fields preceding the information field are collectively referred to as a header, while the fields following the information field are known as a trailer.

The HDLC processor 12 verifies data integrity of the received frame FR1 using its frame check sequence FCS, removes the control field C, and expands the header, thus creating the frame FR2.

The transport-layer reception processor 14 concatenates a series of data units that are successively carried in by the information field, using data sequence information contained in the sequence control field of the frame FR2, and then removes the sequence control field being now of no use. This results in a frame FR3. Full details of the information field assembling and segmentation will be described later with reference to FIG. 7.

The first protocol converter 60 converts the frame FR3 to the frame FR4 by replacing the existing header to a new one that consists of three fields—CMDid, PORT, and SEQno—as will be described later. The TCP processor 23a creates a frame TCP1 by assigning the entire frame FR4 as the main body (i.e., TCP data) of a new frame and adding some header information (i.e., TCP header) onto the body. Likewise, the IP processor 23b then uses the received frame TCP1 as the main body (i.e., IP data) of a new frame and putting new header information (i.e., IP header) to the body, thus delivering a frame IP1 to the Ethernet processor 22.

The Ethernet processor 22 generates a frame Et1 by putting the entire frame IP1 into the Data field and adding an Ethernet header and a cyclic redundancy check (CRC) code to the top and bottom of the frame. Here, the Ethernet header consists of a preamble Pr, destination address DA, source address SA, and data length fields, and the CRC code allows transmission errors to be detected.

As to a frame transmitted from the Ethernet node to the HDLC node, the frame will travel along the above-described path in the opposite direction, changing its format from one to another. That is, the Ethernet processor 22 receives a frame Et1 and outputs its Data field to the IP processor 23b as a frame IP1, and the IP data field of the frame IP1 is extracted as a frame TCP1 for the TCP processor 23a. The TCP data field of the frame TCP1 is transmitted as a frame FR4 to the first protocol converter 60. Note here that the frame FR4 passes through the socket reception processor 24, which is assigned a task of monitoring the reception of the TCP data.

In the frame conversion process provided by the first protocol converter 60, the CMDid field as part of the frame FR4 is terminated (or removed), and the PORT field is translated into the DA field of a frame FR3. The contents of the PORT and SEQno fields are saved in the first protocol converter 60. The SA field of the frame FR3 is filled in with the address of the protocol converter 3a itself. The transport-layer transmission processor 13 divides the contents of the information field into separate data units and sends each data unit packaged in a frame FR2, managing the sending order of the data units by adding an appropriate sequence control field to each frame FR2. The HDLC processor 12 then converts the frame FR2 into an HDLC frame FR1 and sends it out to the HDLC node.

The following description will present a communications link test method of the present invention, referring again to FIG. 5. A user of the protocol conversion system can invoke a communications link test by manually actuating some control switches disposed at the protocol converter 3a or by entering a start command to the system through the maintenance console 4.

In the case of using the switches to start a communications link test, the TEST switch handler 41 receives switch status signals and sends some test data to the test processor 42 according to the status signals. Using the HDLC processor 12 or the first protocol converter 60, the test processor 42 tests functionalities of the communications link to the HDLC node or to the Ethernet node separately. The result of the test is reported to the user through LED indicators.

On the other hand, in the case of using the maintenance console 4 to start a communications link test, a test request command including test data is entered to the command processor 52 via the RS-232C driver 51. The command processor 52 then parses the command and notifies the test processor 42 of the test data. The test processor 42 executes the test as described in the above paragraph. The user receives the test result through the maintenance console 4 or the LED indicators.

Figure 7:
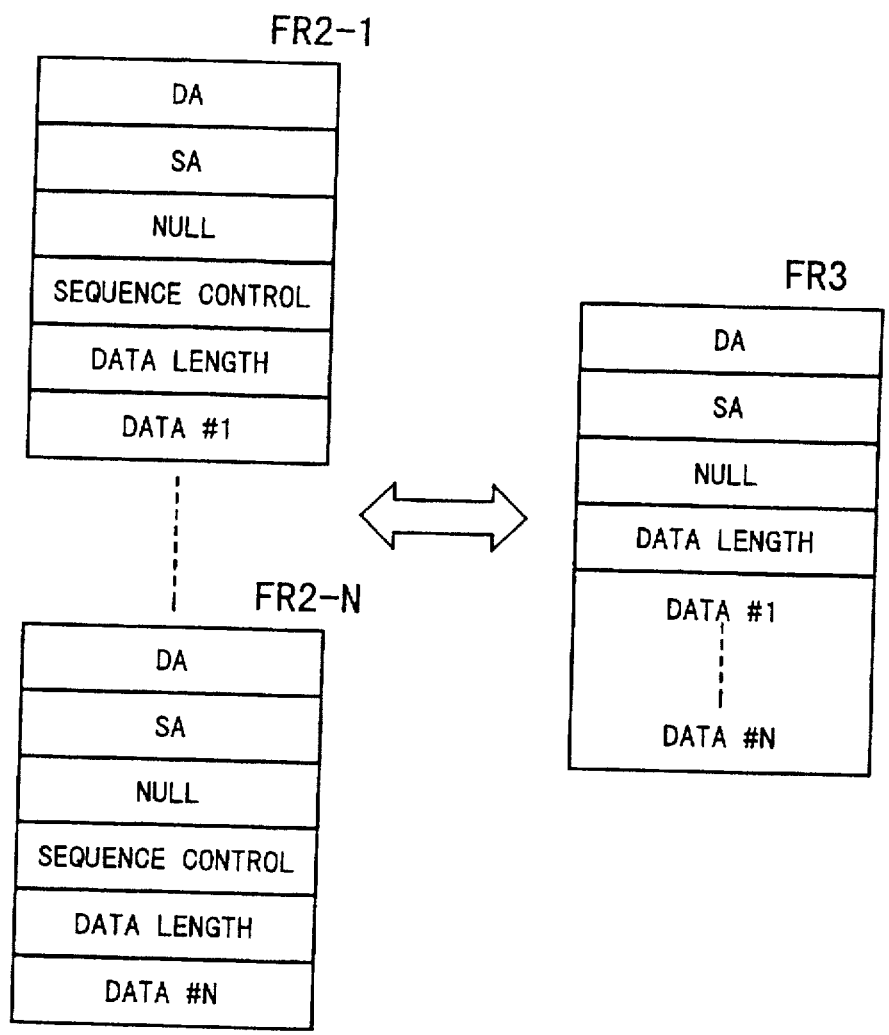
FIG. 7 is a diagram showing how the transport layer process will combine or separate data units.

Next, the segmentation and assembling of the information field in a frame will be described below with reference to FIG. 7, which shows how the transport layer process will combine or separate the data units. Although FIG. 6 illustrates only one frame to explain the frame FR2, actually transported are a series of frames FR2-1 to FR2-N as seen in FIG. 7, which enable a large amount of data to be transferred in a plurality of frames with limited data lengths. The frame FR2-1 holds the first data unit DATA #1 in its information field, and the frame FR2-N holds the N-th data unit DATA #N in the same site. Those FR2 frames coming at random timings are subject to data sequence control by the transport-layer reception processor 14. That is, the transport-layer reception processor 14 concatenates the received data units DATA #1–#N in the proper order, thus packaging them into a single frame FR3.

When the frame FR3 arrived from the Ethernet node side, in turn, the transport-layer transmission processor 13 divides the contents in its information field into a plurality of smaller data units, DATA #1–#N. The transport-layer transmission processor 13 sends out each data unit together with some information for data sequence control, thus converting the single frame FR3 into multiple frames, FR2-1 to FR2-N.

Figure 8:
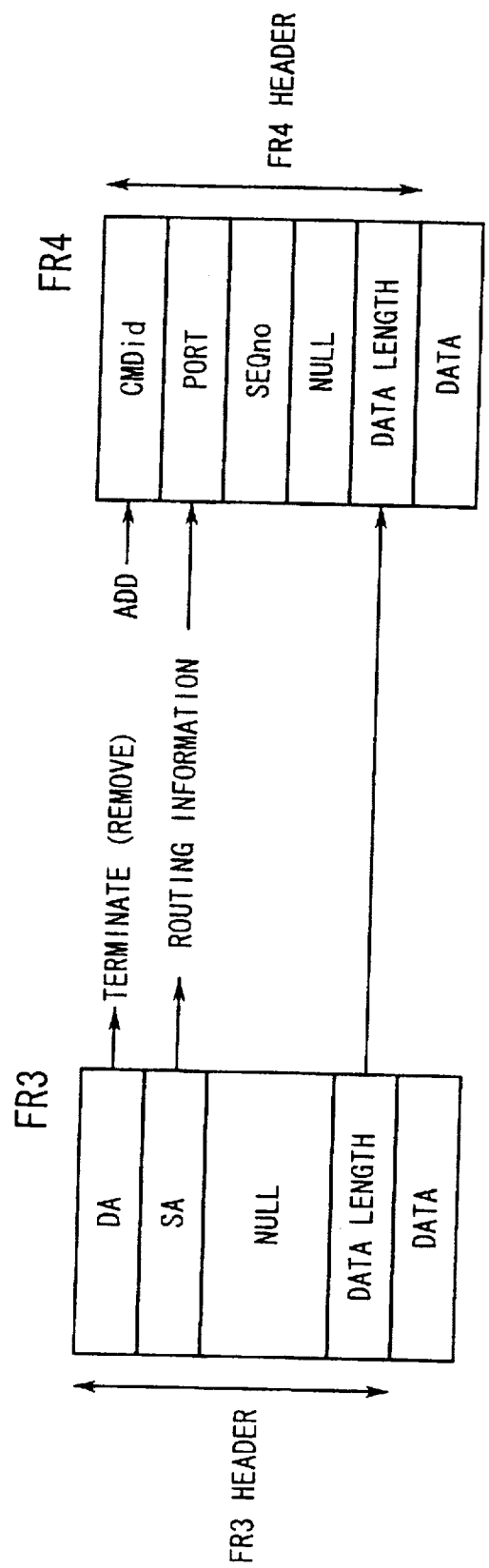
FIG. 8 is a diagram showing how header information is modified when a message is transferred from HDLC network to Ethernet.

The next description will be devoted to the details of frame conversion executed by the first protocol converter 60. FIG. 8 shows how the header of an input frame will be modified when a message is transferred from the HDLC node 1a to the Ethernet node 2a. First, the destination address DA in the frame FR3 is terminated (removed) and, instead, a command identifier CMDid is placed at the top of the frame FR4. Second, some routing information is extracted from the source address field SA of the frame FR3. This is the port information regarding the Ethernet node 2a, and it is converted to a value for the PORT field in the frame FR4. Third, the first protocol converter 60 adds to each frame FR4 a unique sequence number SEQno, which associates commands and responses managed in the protocol converter 3a. With above-described process, the header of each frame is changed from the FR3 header to the FR4 header.

The aforementioned identifier CMDid specifies some different types of commands composed of the following command primitives: Dr (direction), Nt (notification), Cl (control), Ts (test), Re (response), and Er (error). More specifically, the primitive Dr indicates the direction of message flow; the primitives Nt, Cl, Ts, Re, and Er respectively indicate that the frame contains some notification data, control data, test data, response data, and error information.

Figure 9:
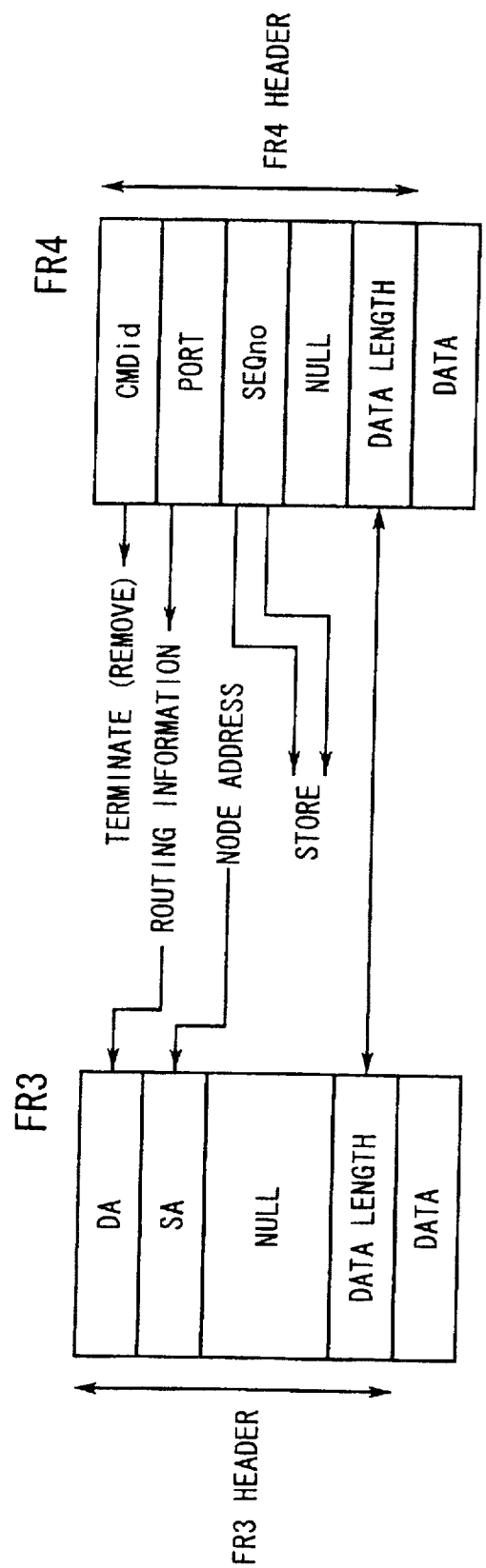
FIG. 9 is a diagram showing how header information is modified when a message is transferred from Ethernet to HDLC network.

FIG. 9 shows how the frame header will be modified when a message is transferred from the Ethernet node to the HDLC node. First, the command identifier CMDid in the frame FR4 is removed. Second, some routing information is extracted from the PORT field in the frame FR4 and translated to the destination address DA pointing at the HDLC node 1a. The contents of the PORT and SEQno fields are saved for future use in transmission of a response message to the Ethernet node 2a. Third, the HDLC address of the protocol converter 3a is entered to the source address field SA of the frame FR3. With the above-described process, the header of the input frame is converted from the FR4 header to the FR3 header.

Figure 10:
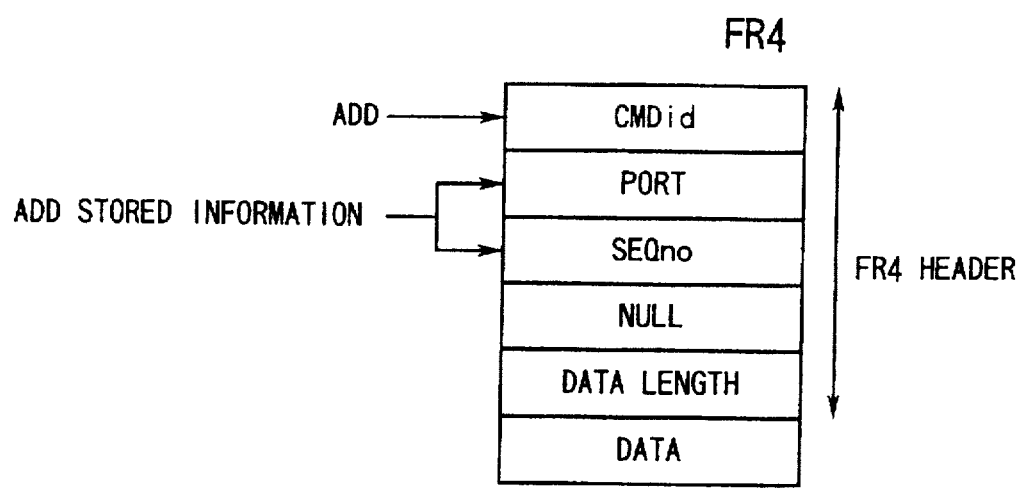
FIG. 10 is a diagram showing the header of a response frame transmitted to an Ethernet node.

FIG. 10 shows the header of a response message addressed to the Ethernet side. The first protocol converter 60 assigns to the frame FR4 a command identifier CMDid and the PORT and SEQno information that were saved when it processed a frame received from the Ethernet node 2a.

Figure 11:
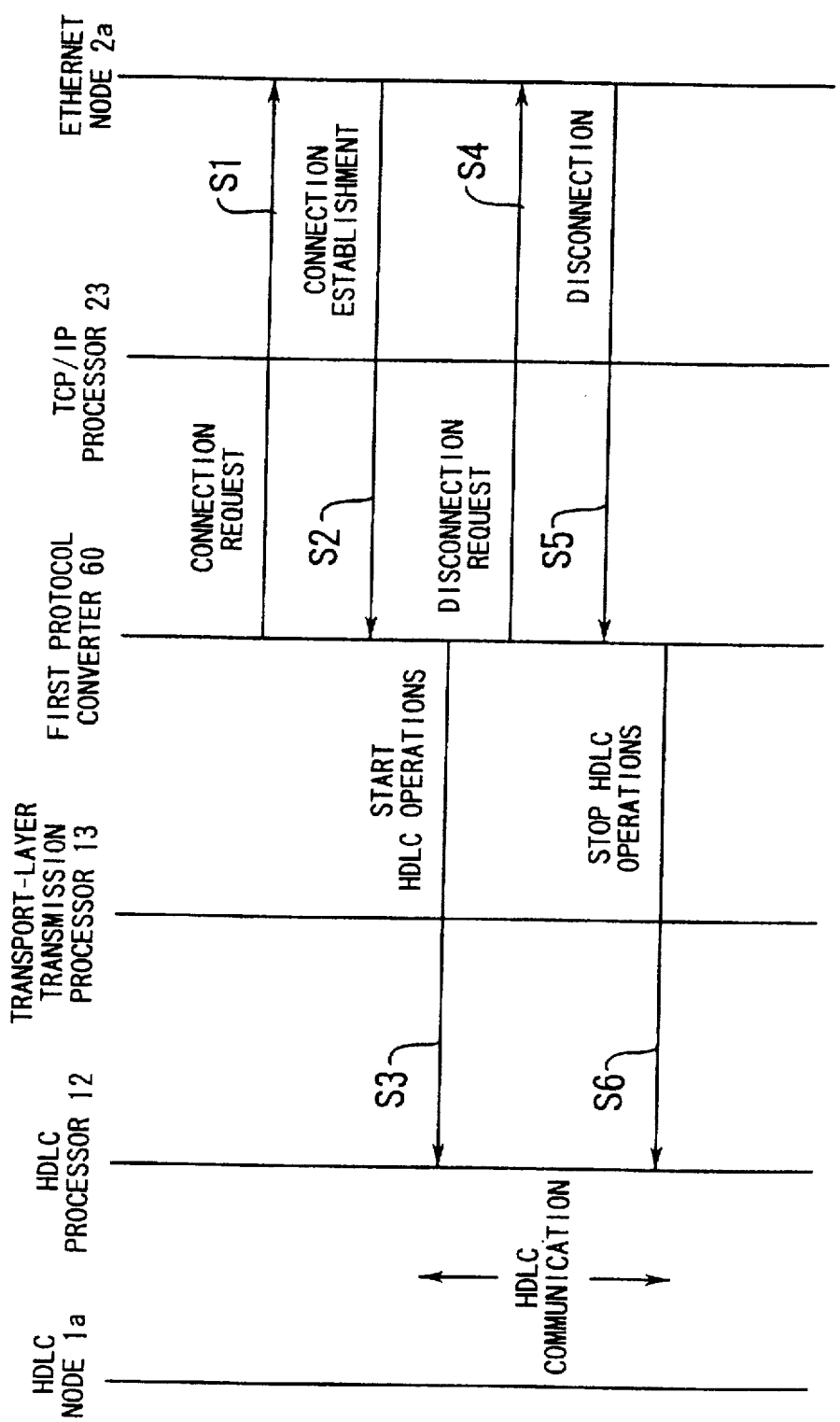
FIG. 11 is a time-sequence diagram showing a message sequence of initiation and termination of data communications.

In the protocol conversion system of the present invention, the function blocks illustrated in FIG. 6 interact with their adjacent blocks or nodes through a variety of message sequences. FIG. 11 is a time-sequence diagram showing a sequence of initiation and termination of data communications. Each arrow in FIG. 11 (also in FIGS. 12–20) shows a message transmitted and its direction.

[S1] The first protocol converter 60 sends a connection request to the Ethernet node 2a using the transport and network layer services provided by the TCP/IP processor 23.

[S2] In response to the request, the Ethernet node 2a sets up a logical connection and returns a message indicating establishment of the logical connection to the first protocol converter 60 through the TCP/IP processor 23.

[S3] The first protocol converter 60 issues a message addressed to the HDLC processor 12 via the transport-layer transmission processor 13. This message permits the HDLC processor 12 to start HDLC operations.

[S4] The first protocol converter 60 sends a disconnection request to the Ethernet node 2a through the TCP/IP processor 23, thus prompting the node to release the logical connection.

[S5] In response to the request, the Ethernet node 2a releases the connection and returns a response message to the first protocol converter 60 via the TCP/IP processor 23, reporting that the disconnection is accomplished.

[S6] Upon disconnection, the first protocol converter 60 directs the HDLC processor 12, through the transport-layer transmission processor 13, to stop the HDLC operations.

The HDLC node 1a uses acknowledged connectionless services, where no connection is required to be set up prior to sending data but some acknowledgment should be returned to confirm correct receipt of transmitted data. On the other hand, the Ethernet node 2a uses connection-oriented services. Therefore, the protocol converter 3a will not send any acknowledgment (ACK) signal to the HDLC node 1a as long as the Ethernet node 2a is not ready to establish the connection (e.g., it is still in the initial conditions after power-up). This interlock makes it possible for the HDLC node 1a to know that the transmitted data has not yet reached the intended destination, thus preventing the further data from being lost.

Figure 12:
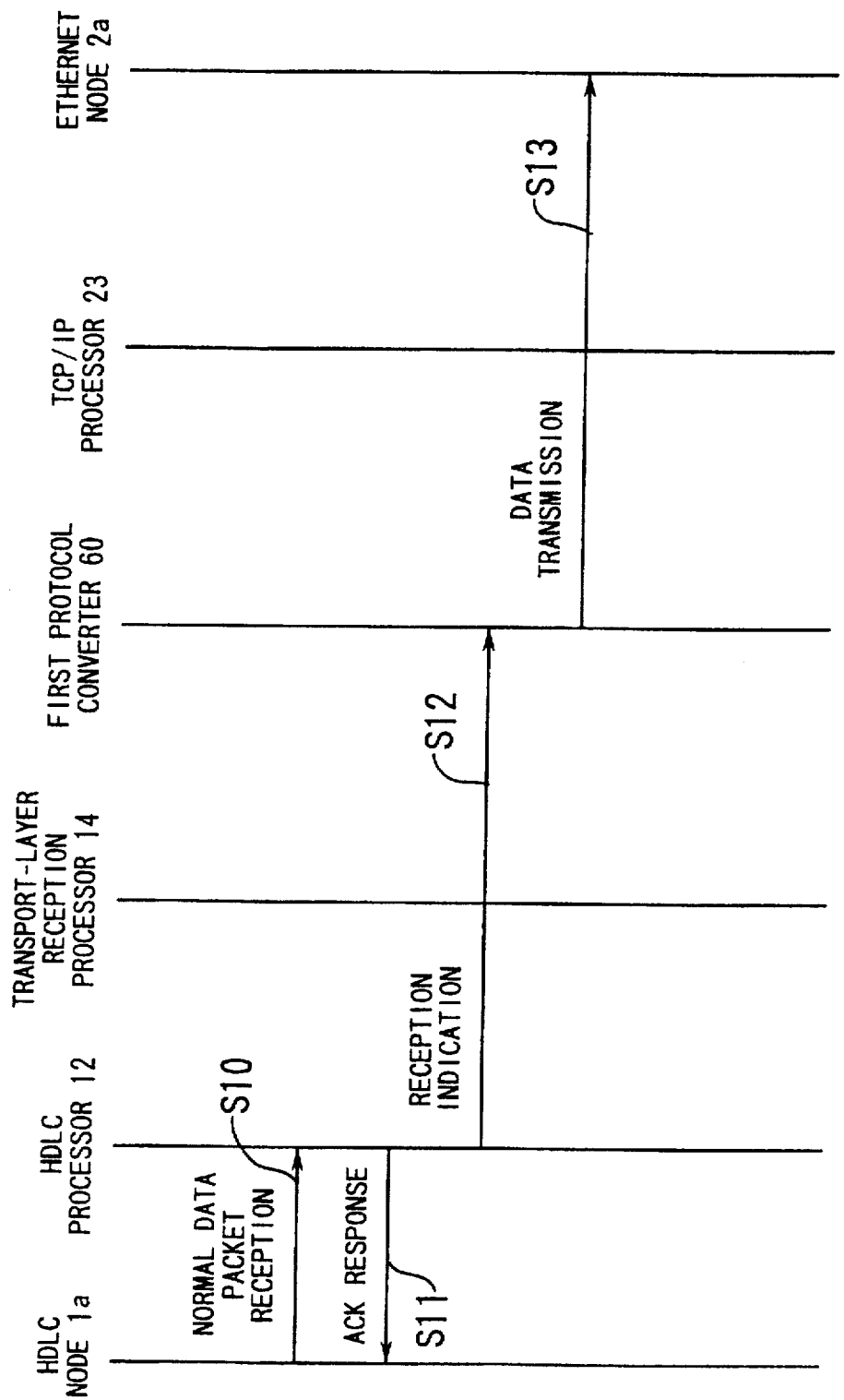
FIG. 12 is a time-sequence diagram showing normal data transmission from an HDLC node to an Ethernet node.

FIG. 12 shows another time-sequence in which data is successfully transmitted from the HDLC node 1a to the Ethernet node 2a.

[S10] The HDLC processor 12 receives a normal data packet from the HDLC node 1a.

[S11] Upon reception of the normal data packet, the HDLC processor 12 returns an ACK response to the HDLC node 1a.

[S12] After returning the ACK response, the HDLC processor 12 notifies the first protocol converter 60 of the reception of a normal data packet, using the layer services of the transport-layer reception processor 14.

[S13] The first protocol converter 60 transmits the data to the Ethernet node 2a through the TCP/IP processor 23.

Because the HDLC node 1a uses acknowledged services, the receiver of a message must acknowledge receipt of the message in a predetermined time frame. The expiration of this time interval will cause an ACK timeout error that indicates unsuccessful data transmission. In the above-described data transmission from the HDLC node 1a to the Ethernet node 2a, the HDLC processor 12 returns an acknowledgment message immediately after informing the Ethernet side of the data reception, thus avoiding the ACK timeout. Since the messages from the HDLC node 1a are promptly acknowledged, the protocol conversion system of the present invention can handle even a quick-tempered protocol with a very short ACK timeout interval.

Figure 13:
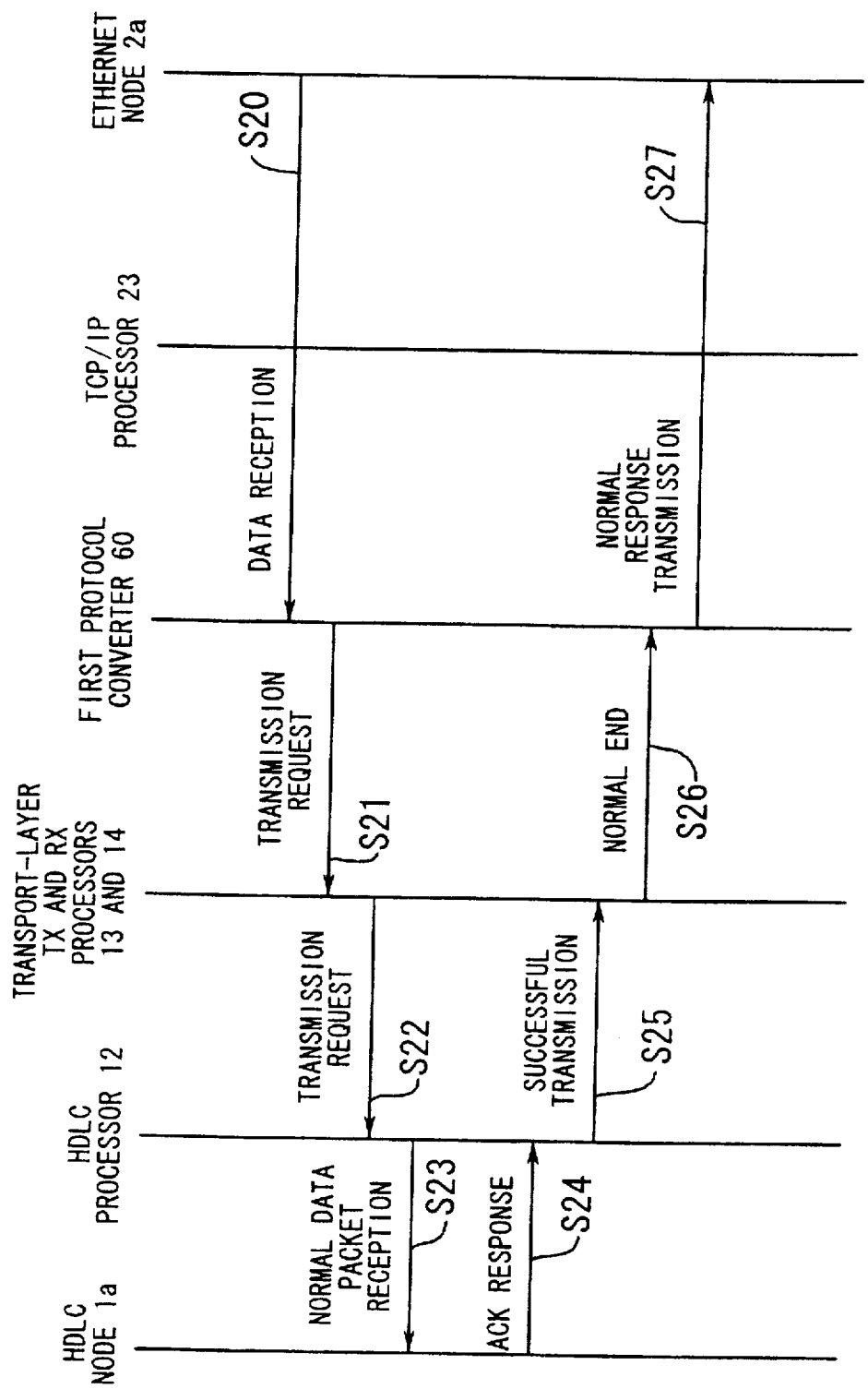
FIG. 13 is a time-sequence diagram showing normal data transmission from the Ethernet node to the HDLC node.

FIG. 13 is a time-sequence diagram showing normal data transmission from the Ethernet node 2a to the HDLC node 1a. This sequence includes some processes of sending back the result of data transmission to the sending end.

[S20] Via the TCP/IP processor 23, the first protocol converter 60 receives data from the Ethernet node 2a.

[S21] The first protocol converter 60 sends a data transmission request to prompt the transport-layer transmission processor 13 to transfer the received data.

[S22] The transport-layer transmission processor 13 sends a data transmission request to prompt the HDLC processor 12 to transfer the received data.

[S23] The HDLC node 1a receives from the HDLC processor 12 normal data packets that are specified in the data transmission request.

[S24] The HDLC node 1a returns an ACK response to the HDLC processor 12.

[S25] The HDLC processor 12 indicates successful transmission to the transport-layer reception processor 14.

[S26] The transport-layer reception processor 14 notifies the first protocol converter 60 of the normal end of the data transmission to the HDLC node 1a.

[S27] The first protocol converter 60 sends a normal response to the Ethernet node 2a via the TCP/IP processor 23.

In the data transmission from the Ethernet node 2a to the HDLC node 1a discussed above, the protocol converter 3a informs the Ethernet node 2a of the successful result of data transmission, upon receipt of an ACK response message from the HDLC node 1a. This improves reliability of data exchange over the two different networks.

Figure 14:
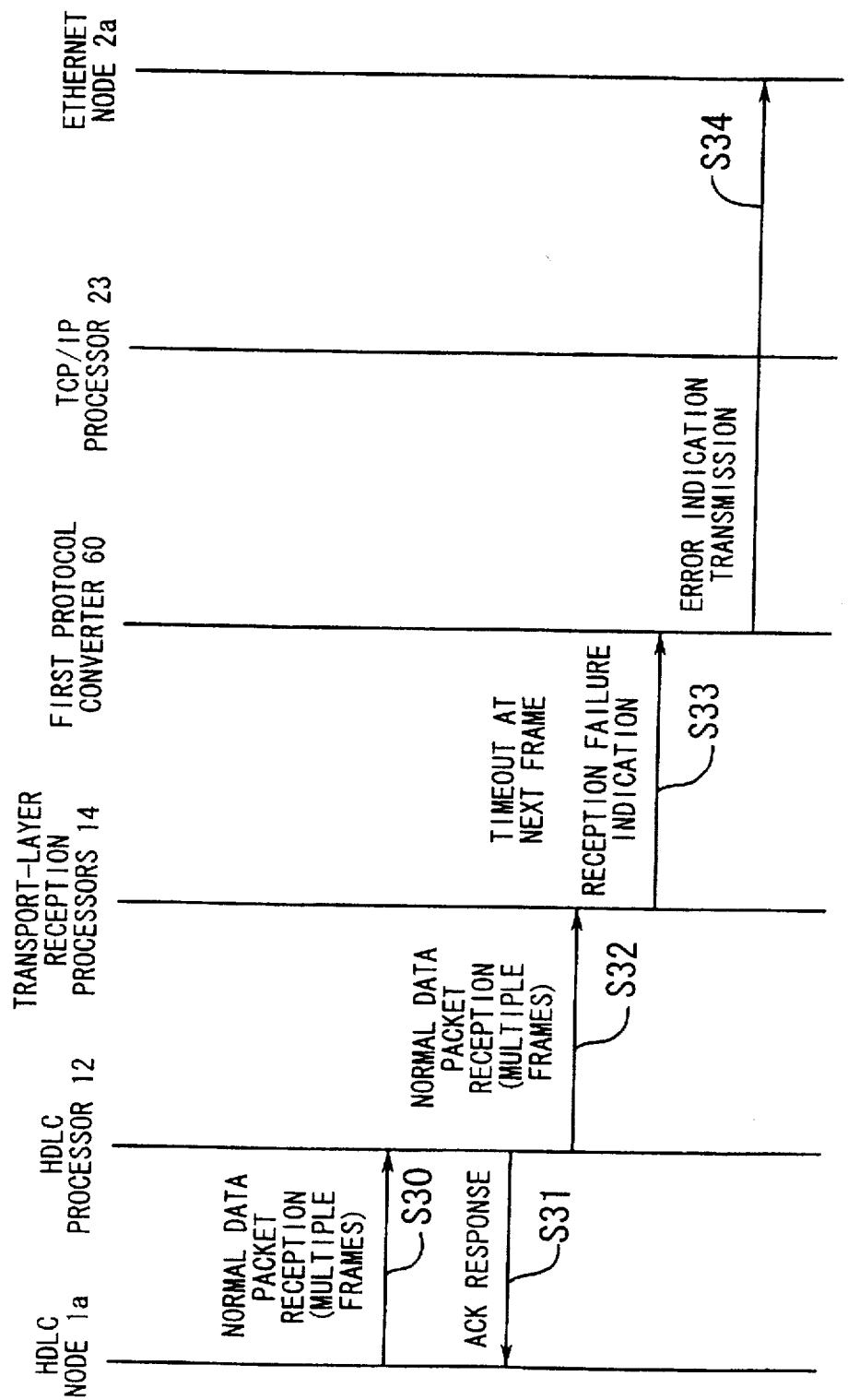
FIG. 14 is a time-sequence diagram showing unsuccessful data transmission from the HDLC node to the Ethernet node in the case that a trouble happened to the HDLC node.

While above description illustrated the sequence in normal situations, a trouble may actually happen somewhere in the link. FIG. 14 specifically shows such a case that the HDLC node 1a attempted to transmit data to the Ethernet node 2a but a trouble happened to the HDLC node in the middle of transmission.

[S30] The HDLC processor 12 begins receiving a series of normal data packets (i.e., a multiple-frame message) from the HDLC node 1a.

[S31] The HDLC processor 12 returns an ACK response to the HDLC node 1a.

[S32] The transport-layer reception processor 14 receives the series of data packets but cannot receive all the frames that are expected to arrive, and accordingly, it detects a timeout error.

[S33] The transport-layer reception processor 14 sends to the first protocol converter 60 a message indicative of a reception error.

[S34] The first protocol converter 60 transmits this reception error indication to the Ethernet node 2a via the TCP/IP processor 23.

As described above, the HDLC processor 12 does not dispose of the data but directs the first protocol converter 60 to inform the Ethernet node 2a of the detected error, thus allowing the Ethernet node 2a to know the fact that the HDLC node 1a has a problem.

Figure 15:
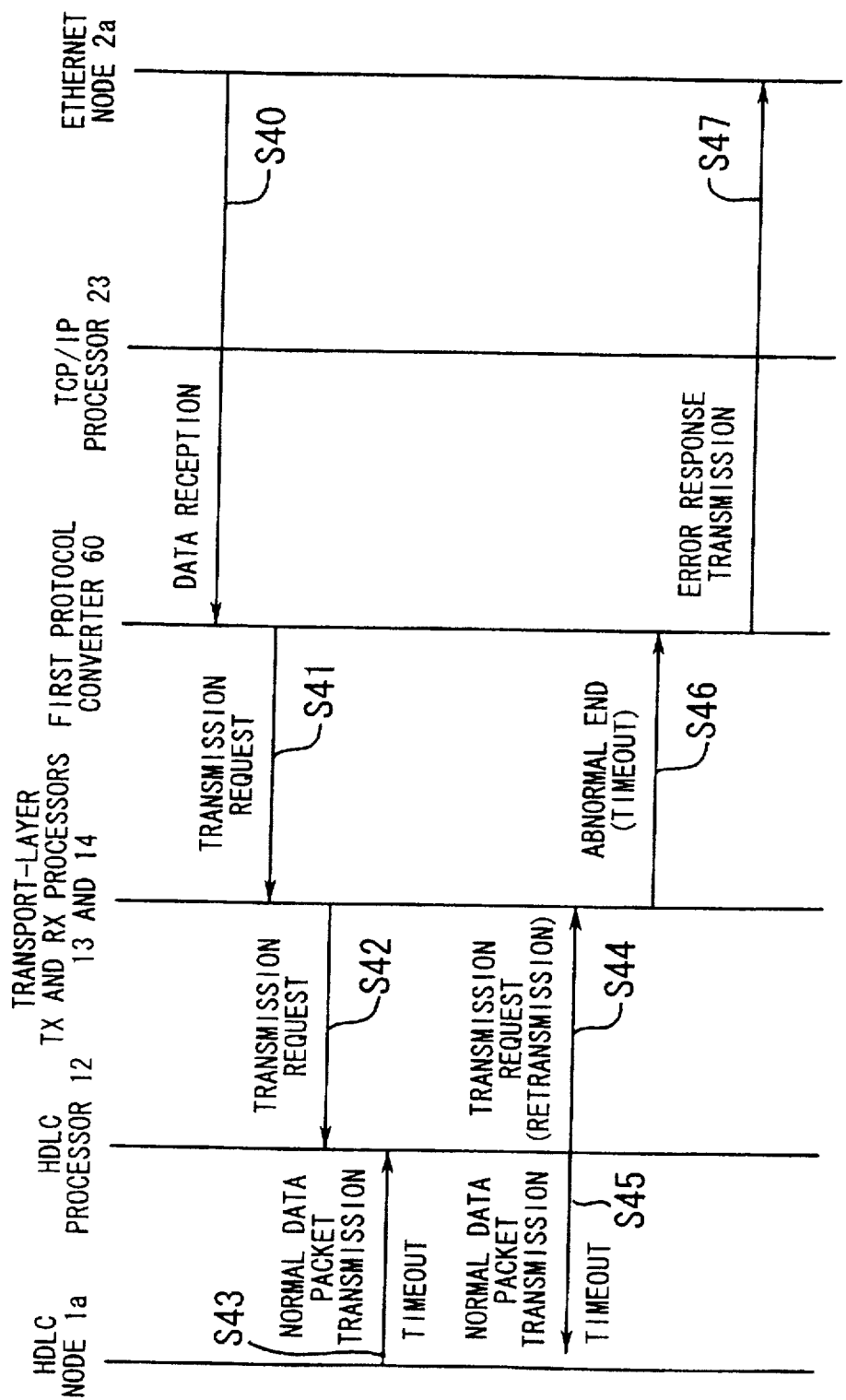
FIG. 15 is a time-sequence diagram showing unsuccessful data transmission from the Ethernet node to the HDLC node in the case that a trouble happened to the HDLC node.

FIG. 15 is a time-sequence diagram showing another case of failure, in which a trouble happens to the HDLC node 1a during data transmission from the Ethernet node 2a to the HDLC node 1a.

[S40] The first protocol converter 60 receives data from the Ethernet node 2a through the TCP/IP processor 23.

[S41] The first protocol converter 60 requests the transport-layer transmission processor 13 to transmit the received data to the HDLC node 1a.

[S42] The transport-layer transmission processor 13 requests the HDLC processor 12 to transmit the received data to the HDLC node 1a.

[S43] In response to the request, the HDLC processor 12 transmits normal data packets to the HDLC node 1a. However, it hears no ACK response from the HDLC node 1a and therefore detects an ACK timeout error.

[S44] The transport-layer transmission processor 13 retries to send the data by commanding again the HDLC processor 12 to perform retransmission.

[S45] Upon the request for retransmission, the HDLC processor 12 sends the normal data packets again to the HDLC node 1a. But no ACK response is returned from the HDLC node 1a, and therefore the HDLC processor 12 detects another ACK timeout error.

[S46] The transport-layer reception processor 14 issues an error message to the first protocol converter 60, which indicates the abnormal end (timeout) of the data transmission process.

[S47] The first protocol converter 60 sends back an error response message to the Ethernet node 2a through the TCP/IP processor 23.

As described above, in the case of ACK timeout error, the first protocol converter 60 will respond to the Ethernet node 2a with an error message, thus allowing the Ethernet node 2a to know the failure of the HDLC node 1a. This negative response is, however, not restricted to the timeout error but can be applied to other types of errors. Such procedures will enable both nodes to be kept informed of their respective status including error conditions. The following description continues showing various cases of error handling in the protocol conversion system of the present invention.

Figure 16:
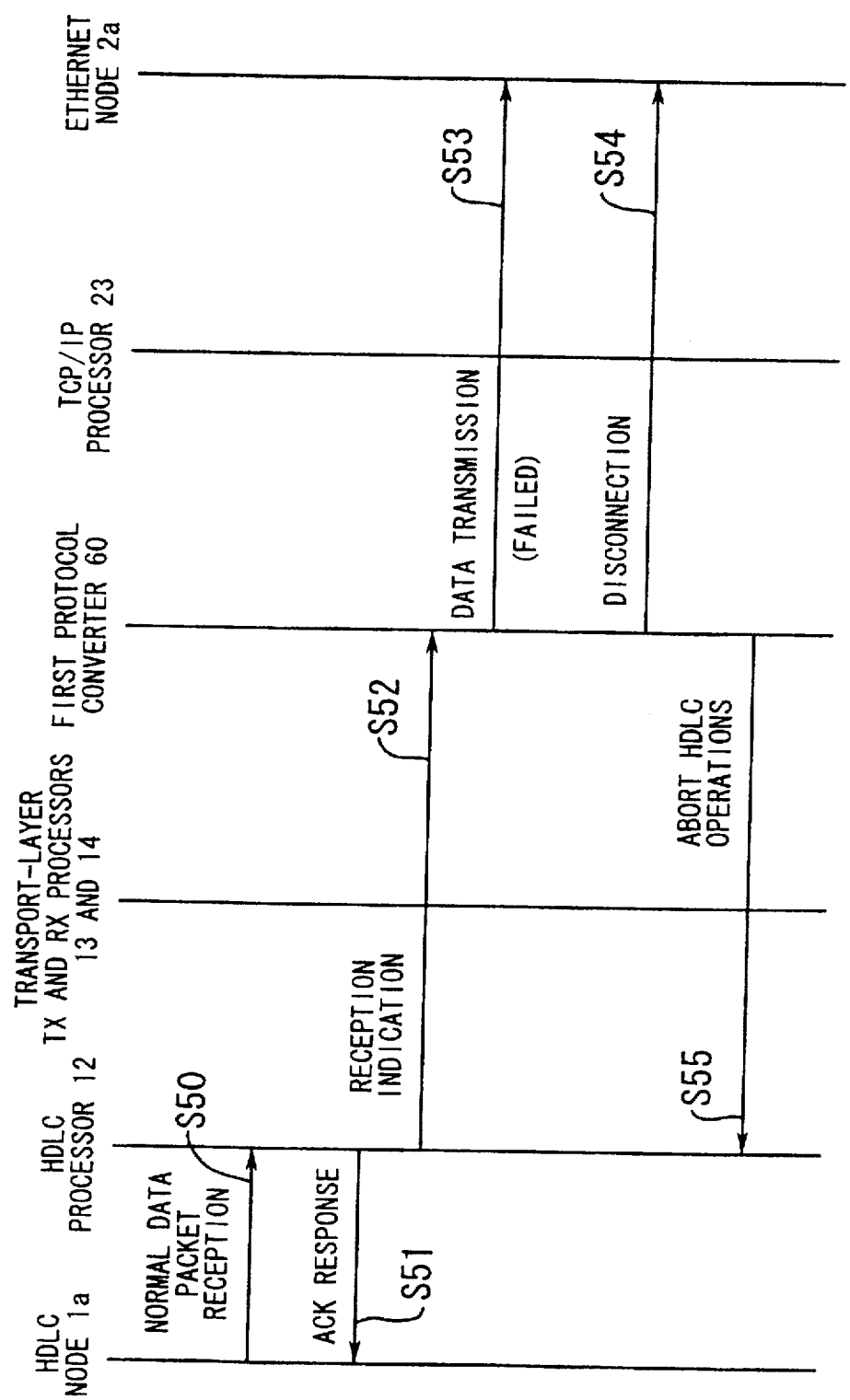
FIG. 16 is a time-sequence diagram showing unsuccessful data transmission from the HDLC node to the Ethernet node in the case that a trouble happened to the Ethernet node.

FIG. 16 shows a data transmission from the HDLC node 1a to the Ethernet node 2a during which the Ethernet node 2a encounters a trouble.

[S50] The HDLC processor 12 receives normal data packets from the HDLC node 1a.

[S51] The HDLC processor 12 returns an ACK response to the HDLC node 1a.

[S52] Via the transport-layer reception processor 14, the HDLC processor 12 notifies the first protocol converter 60 of the reception of data packets.

[S53] Via the TCP/IP processor 23, the first protocol converter 60 attempts to transmit the received data to the Ethernet node 2a. However, this data transmission fails.

[S54] Then the first protocol converter 60 disconnects the logical link that is set up between the protocol converter 3a and the Ethernet node 2a.

[S55] Via the transport-layer transmission processor 13, the first protocol converter 60 directs the HDLC processor 12 to abort the HDLC communications.

When a failure at the Ethernet node 2a is detected, the protocol converter 3a disconnects the logical link once established thereto and aborts HDLC operations as described above. With this link disconnection, the Ethernet node 2a learns that some errors happened and data from the HDLC node 1a could not reach there. Once the HDLC operations are aborted, the protocol converter 3a will never accept further data packets sent from the HDLC node 1a by not returning any ACK response to it.

Figure 17:
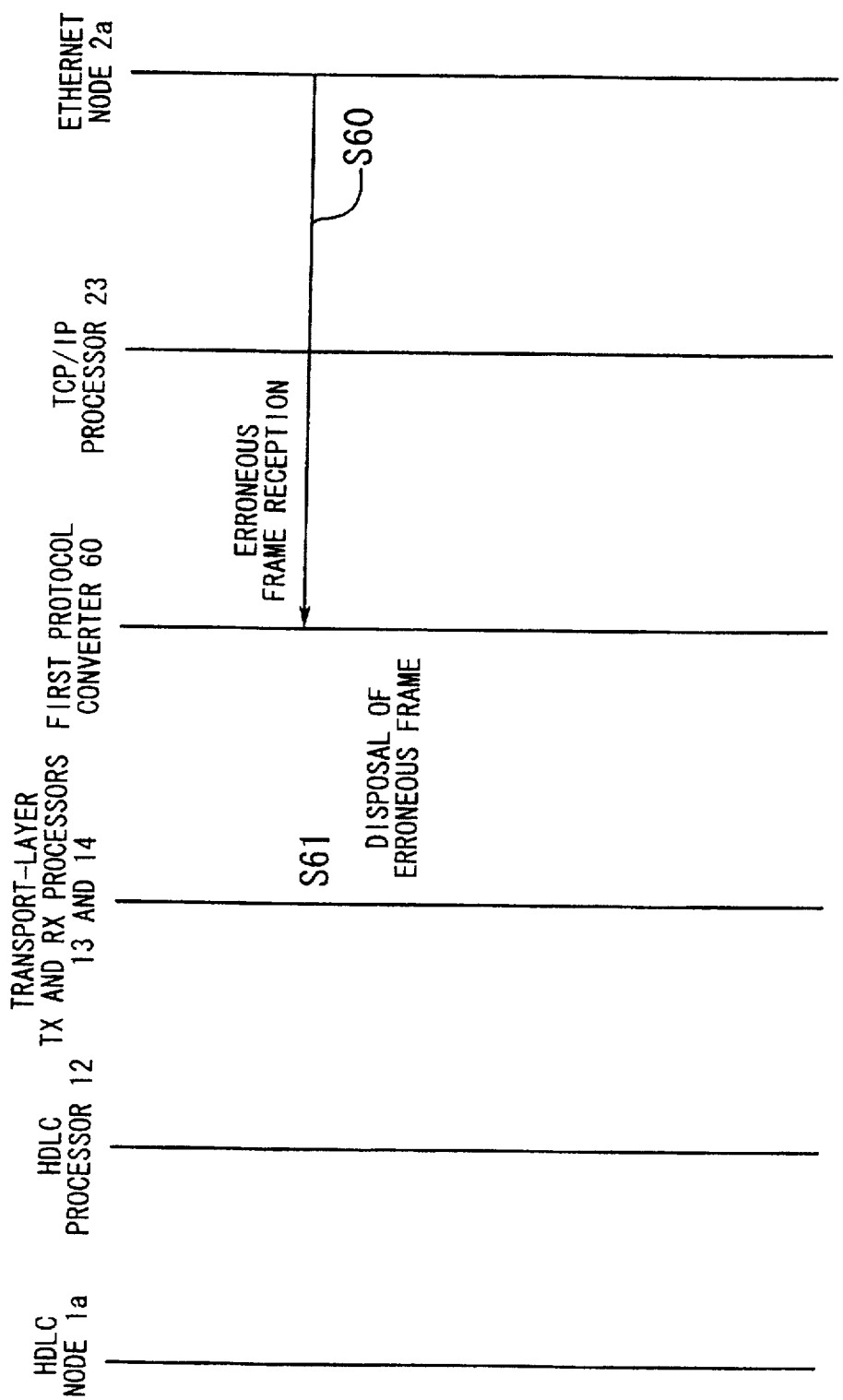
FIG. 17 is a time-sequence diagram showing unsuccessful data transmission from the Ethernet node to the HDLC node in the case that a trouble happened to the Ethernet node.

FIG. 17 shows such a case that the Ethernet node 2a has a problem but is attempting to start data transmission to the HDLC node 1a.

[S60] The Ethernet node 2a transmits a frame addressed to the HDLC node. The first protocol converter 60 receives it via the TCP/IP processor 23. But the frame turns out to be erroneous.

[S61] The first protocol converter 60 simply disposes of the erroneous frame.

The protocol conversion system of the present invention will dispose of a frame received from the Ethernet node 2a if it exhibited some abnormality or inconsistency such as a frame sequence error. Since the upper layer protocols are unable to communicate in that case, the Ethernet node 2a learns that the data has not reached the destination.

Figure 18:
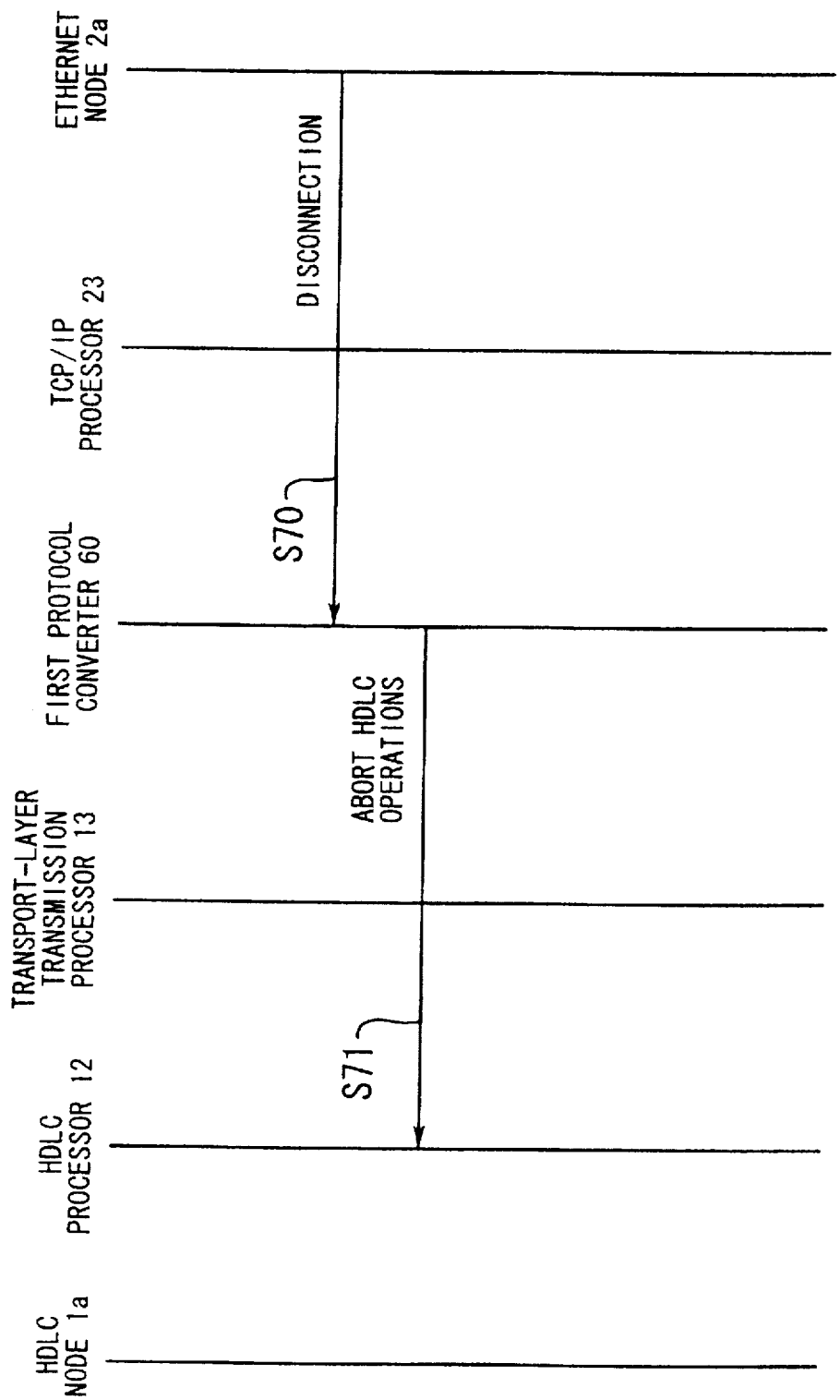
FIG. 18 is a time-sequence diagram showing that the Ethernet node detected a failure of itself.

FIG. 18 is a time-sequence diagram showing that the Ethernet node 2a detected a failure of its own.

[S70] Via the TCP/IP processor 23, the Ethernet node 2a requests the first protocol converter 60 to disconnect the logical link.

[S71] Through the transport-layer transmission processor 13, the first protocol converter 60 directs the HDLC processor 12 to abort the communication with the HDLC side.

As described above, the Ethernet node 2a will issue a request for disconnection when it detected a failure in itself. This inhibits the ACK response from being returned to the HDLC node 1a even if it attempts to send data to the Ethernet node 2a. No response from the protocol converter 3a allows the HDLC node 1a to learn that the Ethernet node 2a is in trouble.

Figure 19:
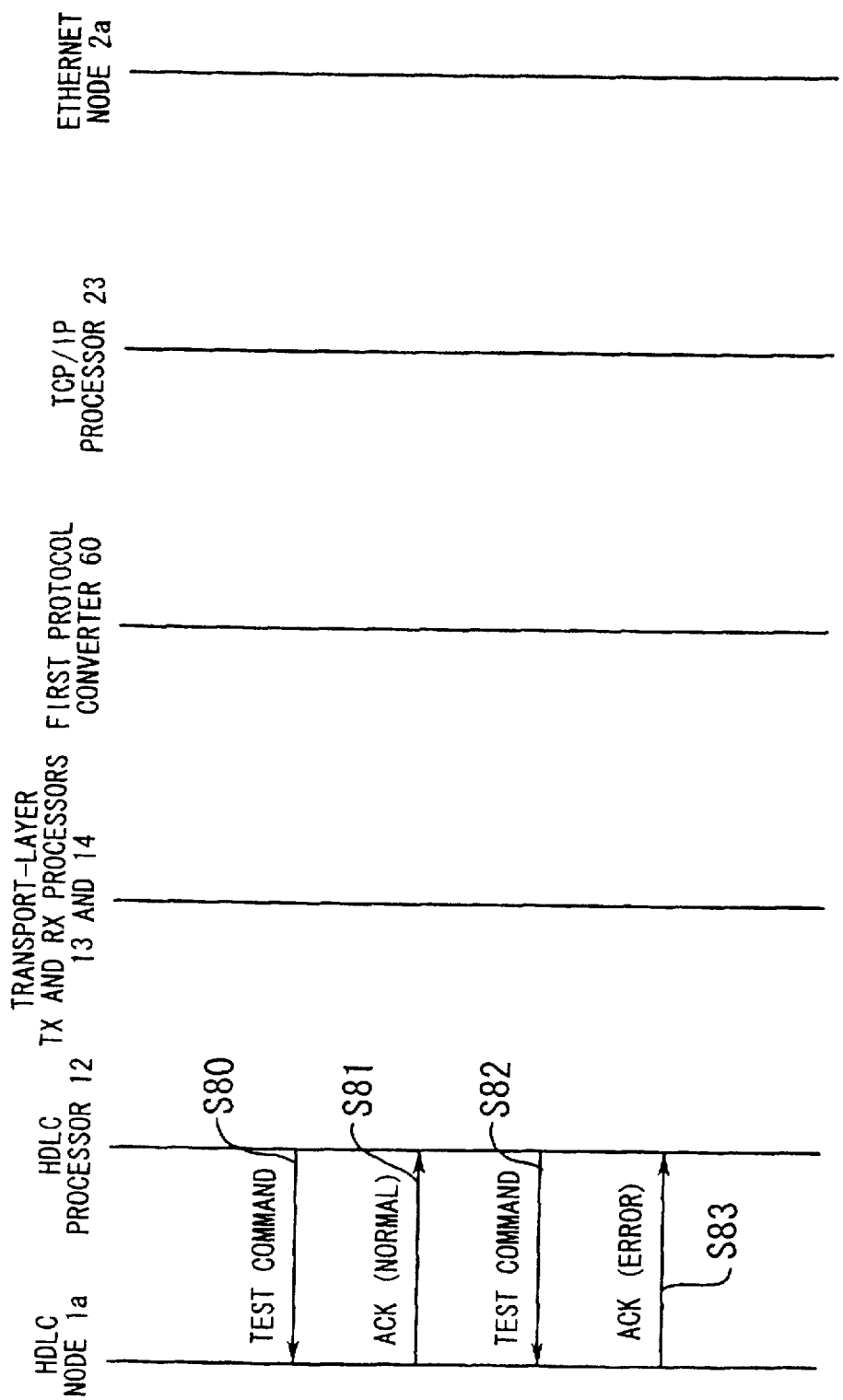
FIG. 19 is a time-sequence diagram showing a communications link test for the HDLC side.

The protocol conversion system of the present invention provides for network diagnostics capabilities to test the communications links to remote nodes. FIG. 19 shows such a diagnostic function to test a communications link reaching the HDLC node 1a.

[S80] The HDLC processor 12 issues a test command to the HDLC node 1a.

[S81] The HDLC node 1a returns an ACK (normal) response to the HDLC processor 12 when the link is normal.

[S82] The HDLC processor 12 issues a test command to the HDLC node 1a.

[S83] The HDLC node 1a returns an ACK (error) response to the HDLC processor 12 when the link is abnormal.

Figure 20:
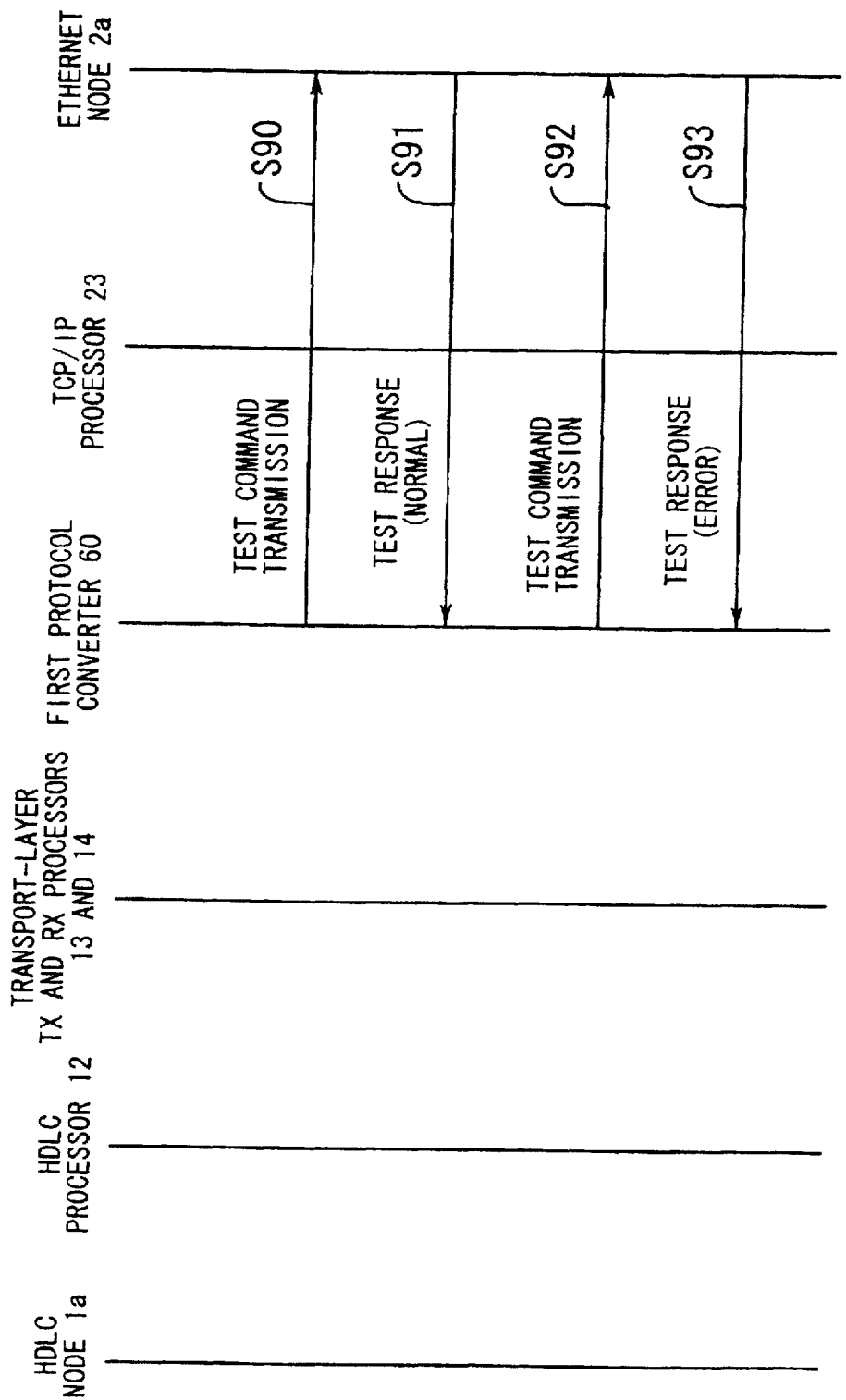
FIG. 20 is a time-sequence diagram showing a communications link test for the Ethernet side.

FIG. 20 is a time-sequence diagram showing a communications link test for the Ethernet node 2a.

[S90] The first protocol converter 60 issues a test command to the Ethernet node 2a.

[S91] The first protocol converter 60 receives a normal test response from the Ethernet node 2a when the test is successfully completed.

[S92] The first protocol converter 60 issues a test command to the Ethernet node 2a.

[S93] The first protocol converter 60 receives a negative test response from the Ethernet node 2a when the test has detected an error.

When a communications link test is finished, the protocol converter 3a receives the result (namely, normal or failure) of the test in the way described above. The user can learn the test result by reading messages displayed on the maintenance console 4 connected to the protocol converter 3a, or by seeing the LED indicators disposed at the protocol converter 3a.

Figure 21:
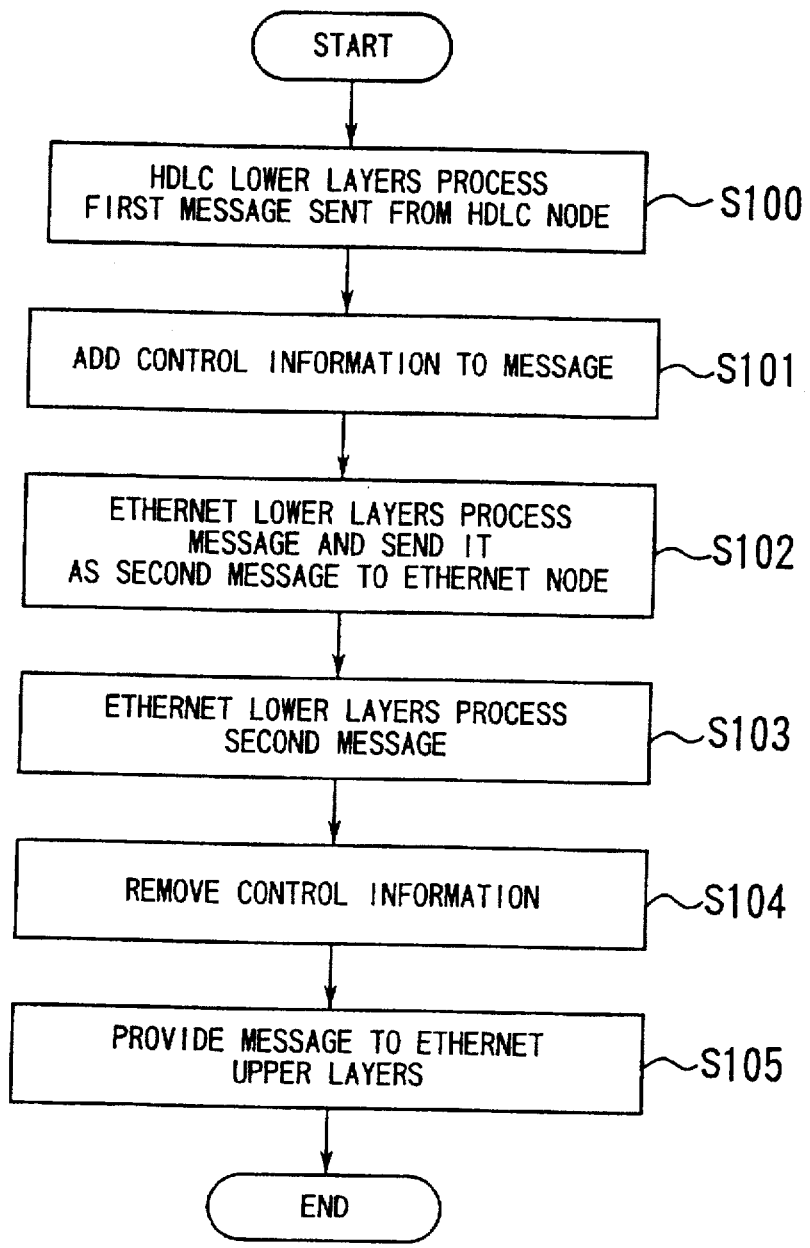
FIG. 21 is a flowchart showing a protocol conversion process when a message is transferred from an HDLC node to an Ethernet node.

The following will describe a protocol conversion method according to the present invention. FIG. 21 is a flowchart showing how messages are converted to a different protocol when transferred from the HDLC node 1a to the Ethernet node 2a.

[S100] Lower layers of the HDLC protocol stack process a first message sent from the HDLC node 1a. This message flows through the protocol stack from the layer-1 (physical layer) to the layer-4 (transport layer).

[S101] The first frame processed in step S100 is then added some control information that is necessary for conversion to the Ethernet protocol.

[S102] Lower layers of the Ethernet protocol stack process the first message that has acquired the control information, passing it from the layer-4 (transport layer) to the layer-1 (physical layer). The processed message is sent as a second message to the Ethernet node 2a.

[S103] At the Ethernet node 2a, lower layers of the Ethernet protocol process the second message, from the layer-1 to the layer-4.

[S104] The control information contained in the second message is terminated (removed).

[S105] The second message without the control information is provided to the Ethernet upper layers.

Figure 22:
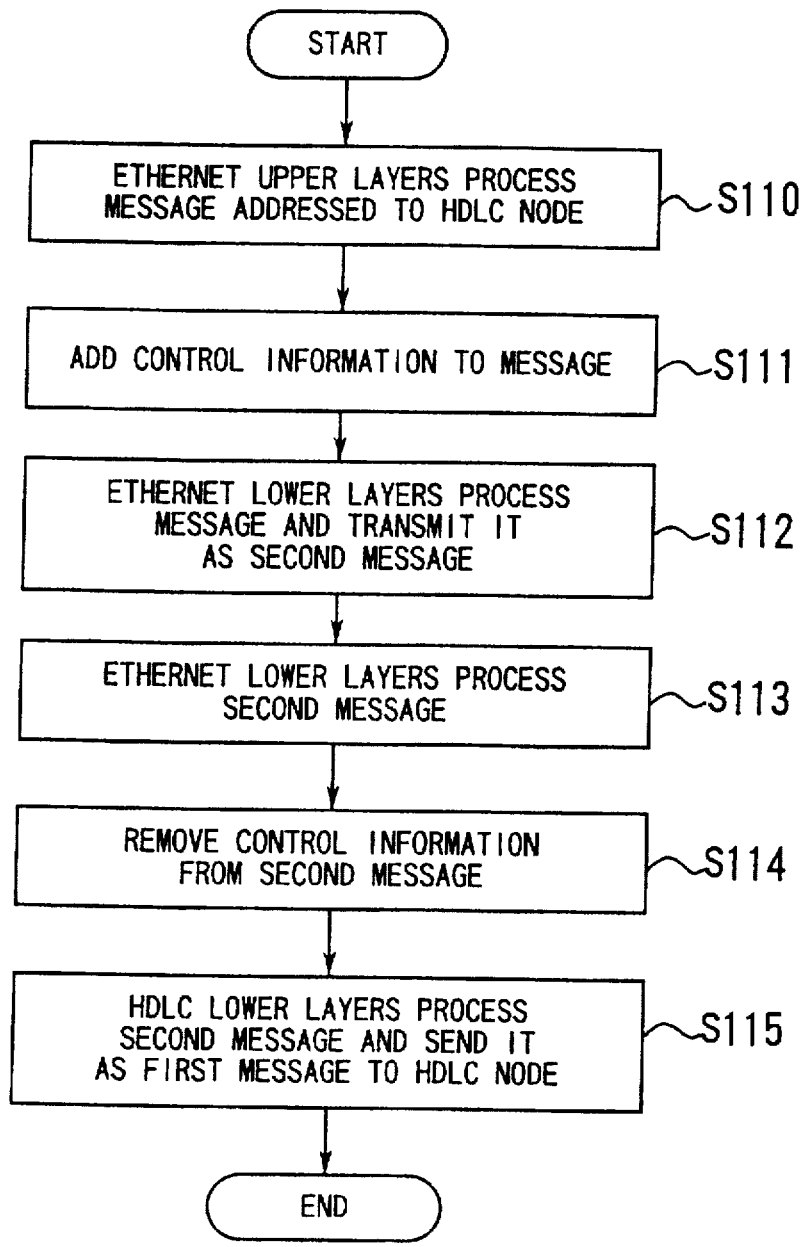
FIG. 22 is a flowchart showing a protocol conversion process when a message is transferred from an Ethernet node to an HDLC node.

In turn, FIG. 22 shows how messages are converted when transferred from the Ethernet node 2a to the HDLC node 1a.

[S110] Ethernet upper layers process a message addressed to the HDLC node 1a. Here, the message flows from the layer-7 (application layer) down to the layer-5 (session layer).

[S111] Some control information is given to the processed frame so that it will be handled by the protocols at the HDLC side.

[S112] Ethernet lower layers process the message with the control information, passing it from the layer-4 down to the layer-1. This frame is then transmitted to the protocol converter 3a as a second message.

[S113] Ethernet lower layers process the received second message, passing it from the layer-1 to the layer-4.

[S114] The control information contained in the second message is removed here. The message is now converted to another frame format which can be handled by the HDLC node 1a.

[S115] Lower layers of the HDLC protocol process the message, passing it from the layer-4 to the layer-1. The processed message is finally sent as a first message to the HDLC node 1a.

Although the above-described embodiment assumed, for illustrative purposes, that the first node 1 (FIG. 1) would use HDLC protocols for data communication, the present invention is not restricted to this configuration. Rather, the protocol for the first node 1 can be any other protocols that support connectionless lower-layer services. Furthermore, in the present invention, the protocol for the second node 2 is not restricted to the Ethernet LAN protocol but may be other connection-oriented lower-layer protocols.

The above discussion will be summarized as follows. According to the protocol conversion system and protocol conversion method of the present invention, the conversion is performed at an intermediate point between lower layers and upper layers of a protocol stack. This structural arrangement enables flexible and reliable data exchange between network entities.

Further, the protocol conversion system of the present invention is equipped with integrated network diagnostics capabilities, in which a maintenance console connected thereto is used to carry out communications link tests. This configuration enables a test to be performed individually at either side of the two networks that are bridged by the protocol conversion system; there is no need to prepare the nodes at both sides for testing purposes.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A protocol conversion system for converting communications protocols to enable two different networks to exchange data by transmitting and receiving messages, comprising:

a first node using a first communications protocol that defines a set of rules for communications in a first network;

a second node using a second communications protocol that defines a set of rules for communications in a second network, said second node comprising second protocol conversion means for adding first control information to the messages to be sent out and for removing second control information from the messages received, said first control information being required in frame conversion to the first communications protocol, said second control information being required in frame conversion to the second communications protocol; and a protocol converter, disposed between said first and second networks, for relaying the messages between said first and second nodes, comprising first message processing means, coupled to said first node via the first network, for processing the messages according to layer definitions of the first communications protocol, second message processing means, coupled to said second node via the second network, for processing the messages according to layer definitions of the second communications protocol, and first protocol conversion means, disposed between said first and second message processing means, for converting the messages received from said second message processing means by using the first control information removed therefrom and passing to said first message processing means the converted messages having a frame format acceptable for the first node, and for adding the second control information to the messages received from the first message processing means and passing the messages with the second control information to said second message processing means.

2. A protocol conversion system according to claim 1, wherein said first and second message processing means process the frames according to definitions of lower layers of the first and second communications protocols, respectively.

3. A protocol conversion system according to claim 1, wherein said second protocol conversion means is disposed between a transport layer and a session layer of the second communications protocol.

4. A protocol conversion system according to claim 1, wherein said first node has a lower protocol layer that provides a connectionless service and said second node has a lower protocol layer that provides a connection-oriented service.

5. A protocol conversion system according to claim 1, wherein said first protocol conversion means replace a header of the message with a new header that comprises a command identifier distinguishing command types, a port number identifying a source address or a destination address, and a sequence number associating each command and response.

6. A protocol conversion system according to claim 1, wherein said protocol converter separately tests a first communications link between said protocol converter and said first node and a second communications link between said protocol converter and said second node, by transmitting test data thereto.

7. A protocol conversion system according to claim 1, wherein said first message processing means starts processing the messages after a logical connection is established between said protocol converter and said second node and stops processing the messages when the logical connection is released.

8. A protocol conversion system according to claim 1, wherein, when a communication error occurred during communication between said first node and said protocol converter, said protocol converter informs said second node of occurrence of the communication error.

9. A protocol conversion system according to claim 1, wherein, when a communication error occurred during communication between said second node and said protocol converter, said protocol converter disconnect a logical connection established between said protocol converter and said second node.

10. A protocol conversion system according to claim 1, wherein an upper protocol layer of said first node and an upper protocol layer of said second node are based on a common protocol.

11. A protocol conversion method of converting communications protocols to enable two different networks to exchange data by transmitting and receiving messages, wherein said two different networks include a first node that belongs to a first network and uses a first communications protocol and a second node that belongs to a second network and uses a second communications protocol, said protocol conversion method comprising the steps of:

processing a first message received from the first-node according to lower layer definitions of the first communications protocol;

adding control information for conversion to the second communications protocol to the first message;

producing a second message by processing the first message having the control information according to lower layer definitions of the second communications protocol;

sending the second message to the second node;

processing the second message at the second node according to the lower layer definitions of the second communications protocol;

removing the control information from the second message; and sending the second message without the control information to upper layers of the second communications protocol.

12. A protocol conversion method of converting communications protocols to enable two different networks to exchange data by transmitting and receiving messages, wherein said two different networks include a first node that is located in a first network and uses a first communications protocol and a second node that is located in a second network and uses a second communications protocol, said protocol conversion method comprising the steps of:

processing a message at the second node according to upper layer definitions of the second communications protocol;

adding control information for conversion to the first communications protocol to the message processed;

producing a second message by processing the message having the control information according to lower layer definitions of the second communications protocol;

processing the second message according to the lower layer definitions of the second communications protocol;

removing the control information from the second message;

converting the second message to a frame format that can be handled by the first node;

producing a first message by processing the converted second message according to the lower layer definitions of the second communications protocol; and sending the first message to the first node.

* * * * *